(12) United States Patent
Nam et al.

(10) Patent No.: US 12,014,107 B2
(45) Date of Patent: Jun. 18, 2024

(54) DISPLAY APPARATUS AND VEHICLE INCLUDING THE SAME

(71) Applicant: LG Display Co., Ltd., Seoul (KR)

(72) Inventors: Seulki Nam, Paju-si (KR); Taehyung Kim, Paju-si (KR); Sunbok Song, Paju-si (KR); Seunghyeon Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 15 days.

(21) Appl. No.: 17/572,628

(22) Filed: Jan. 11, 2022

(65) Prior Publication Data

US 2022/0129234 A1   Apr. 28, 2022

Related U.S. Application Data

(63) Continuation of application No. 16/573,404, filed on Sep. 17, 2019, now Pat. No. 11,256,468.

(30) Foreign Application Priority Data

Jul. 22, 2019   (KR) .................. 10-2019-0088598

(51) Int. Cl.
*G06F 3/16*     (2006.01)
*B60K 35/22*    (2024.01)
(Continued)

(52) U.S. Cl.
CPC ............. *G06F 3/16* (2013.01); *B60K 35/60* (2024.01); *G06F 1/1601* (2013.01);
(Continued)

(58) Field of Classification Search
None
See application file for complete search history.

(56) References Cited

U.S. PATENT DOCUMENTS 9,978,293 B2   5/2018   Cho et al.
10,582,282 B2  3/2020   Kim
(Continued)

FOREIGN PATENT DOCUMENTS

CN   205847543 U   12/2016
CN   109218943 A    1/2019
(Continued)

OTHER PUBLICATIONS

Office Action dated May 25, 2023, issued in corresponding Japanese divisional Patent Application No. 2022-044080.
(Continued)

*Primary Examiner* — Walter F Briney, III
(74) *Attorney, Agent, or Firm* — Morgan, Lewis & Bockius LLP

(57) ABSTRACT

A display apparatus includes a display panel configured to display an image, a front member on a front surface of the display panel, a driving circuit on a rear surface of the display panel and connected to the display panel, a supporting frame configured to surround a side surface of the display panel and a side surface of the driving circuit, a first support supported by the supporting frame and on the rear surface of the display panel, and a vibration generating module supported by the first support to vibrate the display panel.

25 Claims, 13 Drawing Sheets

(51) Int. Cl.
  *B60K 35/60* (2024.01)
  *G06F 1/16* (2006.01)
  *G06F 3/14* (2006.01)
  *H04R 17/00* (2006.01)

(52) U.S. Cl.
  CPC .......... *G06F 3/1446* (2013.01); *H04R 17/00* (2013.01); *B60K 35/22* (2024.01); *H04R 2499/13* (2013.01)

(56) References Cited

U.S. PATENT DOCUMENTS

| | | | |
|---|---|---|---|
| 10,595,109 | B2 | 3/2020 | Shin et al. |
| 2004/0000877 | A1 | 1/2004 | Morton et al. |
| 2006/0006296 | A1 | 1/2006 | Morita |
| 2007/0126328 | A1 | 7/2007 | Cho |
| 2007/0159777 | A1 | 7/2007 | Shin |
| 2008/0273722 | A1 | 11/2008 | Aylward et al. |
| 2008/0273723 | A1 | 11/2008 | Hartung et al. |
| 2012/0057730 | A1 | 3/2012 | Fujise et al. |
| 2012/0140969 | A1 | 6/2012 | Fujise et al. |
| 2013/0243224 | A1 | 9/2013 | Onishi et al. |
| 2014/0226266 | A1 | 8/2014 | Kang et al. |
| 2015/0185963 | A1 | 7/2015 | Lee et al. |
| 2015/0341714 | A1 | 11/2015 | Ahn et al. |
| 2015/0373441 | A1 | 12/2015 | Behles et al. |
| 2016/0050472 | A1 | 2/2016 | Lee et al. |
| 2016/0127836 | A1 | 5/2016 | Zaitsu et al. |
| 2017/0070811 | A1 | 3/2017 | Mihelich et al. |
| 2017/0280234 | A1* | 9/2017 | Choi .................. H04R 7/045 |
| 2018/0070391 | A1* | 3/2018 | Galeotti ................ H04W 76/10 |
| 2018/0079284 | A1 | 3/2018 | Choi et al. |
| 2018/0317011 | A1 | 11/2018 | Choi et al. |
| 2018/0326851 | A1 | 11/2018 | Kim et al. |
| 2018/0332376 | A1 | 11/2018 | Lee |
| 2018/0348816 | A1 | 12/2018 | Lee et al. |
| 2019/0004566 | A1 | 1/2019 | Lee et al. |
| 2019/0014402 | A1 | 1/2019 | Ahn et al. |
| 2019/0037164 | A1* | 1/2019 | Kim .................... H04R 17/005 |
| 2019/0045286 | A1 | 2/2019 | Kim et al. |
| 2019/0050024 | A1 | 2/2019 | Ahn et al. |
| 2019/0079717 | A1 | 3/2019 | Lee et al. |
| 2019/0098411 | A1 | 3/2019 | Ham et al. |
| 2019/0141424 | A1 | 5/2019 | Kim et al. |
| 2019/0182572 | A1 | 6/2019 | Kim |
| 2019/0182573 | A1 | 6/2019 | Shin et al. |
| 2019/0191240 | A1 | 6/2019 | Ham et al. |
| 2019/0339739 | A1* | 11/2019 | Park .................... G06F 1/1652 |
| 2020/0379709 | A1* | 12/2020 | Kim .................... G10K 9/128 |

FOREIGN PATENT DOCUMENTS

| | | |
|---|---|---|
| CN | 109326236 A | 2/2019 |
| CN | 109391889 A | 2/2019 |
| CN | 109769176 A | 5/2019 |
| JP | 2003-233056 A | 8/2003 |
| JP | 2003-330001 A | 11/2003 |
| JP | 2005-134971 A | 5/2005 |
| JP | 2011-126374 A | 6/2011 |
| JP | 2015-088900 A | 5/2015 |
| JP | 2016-509778 A | 3/2016 |
| JP | 2017-156623 A | 9/2017 |
| JP | 2017-184223 A | 10/2017 |
| JP | 2018-110369 A | 7/2018 |
| KR | 10-1704517 B1 | 2/2017 |
| KR | 10-2018-0032110 A | 3/2018 |
| KR | 10-2018-0121296 A | 11/2018 |
| KR | 10-2018-0131228 A | 12/2018 |
| KR | 10-2019-0033277 A | 3/2019 |
| KR | 10-2019-0074540 A | 6/2019 |
| WO | 2014/192301 A1 | 12/2014 |

OTHER PUBLICATIONS

Japanese Office Action dated Jul. 30, 2021, issued in corresponding Japanese Patent Application No. 2020-119913.
Chinese Office Action dated Jul. 27, 2021, issued in corresponding Chinese Patent Application No. 201910887166.2.
Office Action dated Jan. 25, 2024, issued in corresponding Korean Patent Application No. 10-2019-0088598.
Office Action dated Mar. 14, 2024, issued in corresponding Chinese Patent Application No. 202210089547.8.
Office Action dated Mar. 25, 2024, issued in corresponding Chinese Patent Application No. 202210086428.7.

* cited by examiner

DISPLAY APPARATUS AND VEHICLE INCLUDING THE SAME

CROSS-REFERENCE TO RELATED APPLICATIONS

This application is a continuation of a co-pending U.S. patent application Ser. No. 16/573,404, filed on Sep. 17, 2019, which claims the benefit of and priority to Korean Patent Application No. 10-2019-0088598, filed on Jul. 22, 2019. All of the above-identified prior U.S. and Korean Patent Applications are incorporated herein by reference as if fully set forth herein.

BACKGROUND

Technical Field

The present disclosure relates to a display apparatus and a vehicle including the same.

Discussion of the Related Art

Display apparatuses are equipped in home appliances and electronic apparatuses, such as televisions (TVs), monitors, notebook computers, smartphones, tablet computers, electronic organizers, electronic pads, wearable apparatuses, watch phones, portable information apparatuses, navigation apparatuses, and automotive control display apparatuses, and are used as a screen for displaying an image.

Display apparatuses may include a display panel for displaying an image and a sound device for outputting a sound associated with the image. However, in general display apparatuses, because a sound output from a sound device may travel to a rearward or a downward direction of the display apparatus, sound quality may be degraded due to interference between sounds reflected from a wall and the ground. For this reason, it may be difficult to transfer an accurate sound, and an immersion experience of a viewer is reduced.

SUMMARY

Accordingly, the present disclosure is directed to a display apparatus and a vehicle including the same that substantially obviate one or more problems due to limitations and disadvantages of the related art.

The inventors have recognized problems of general display apparatuses and have performed various experiments so that, when a user in front of a display panel is watching an image, a traveling direction of sound is toward a front surface of the display panel. Thus, sound quality may be enhanced. Thus, through the various experiments, the inventors have invented a display apparatus that may generate sound traveling to a forward region in front of the display panel, thereby enhancing sound quality.

An aspect of the present disclosure is to provide a display apparatus and a vehicle including the same, which output sound to a forward region in front of a display panel.

Another aspect of the present disclosure is to provide a display apparatus and a vehicle including the same, which improve sound quality and increase an immersion experience of a viewer or listener.

Another aspect of the present disclosure is to provide a display apparatus and a vehicle including the same, which improve sound performance and sound pressure characteristic.

Another aspect of the present disclosure is to provide a display apparatus for preventing or minimizing damage of a driving circuit caused by a vibration of a display panel and a vehicle including the same.

Additional advantages and features of the disclosure will be set forth in the description that follows, and in part will be apparent from the description, or may be learned be practice of the inventive concepts provided herein. Other features and aspects of the inventive concepts may be realized and attained by the structure particularly pointed out in the written description, or derivable therefrom, and in the claims hereof as well as the appended drawings.

To achieve these and other aspects of the inventive concepts as embodied and broadly described herein, there is provided a display apparatus comprising a display panel configured to display an image; a front member on a front surface of the display panel; a driving circuit on a rear surface of the display panel and connected to the display panel; a supporting frame configured to surround a side surface of the display panel and a side surface of the driving circuit; a first support supported by the supporting frame and on the rear surface of the display panel; and a vibration generating module supported by the first support to vibrate the display panel.

In another aspect, there is provided a display apparatus comprising a display panel configured to display an image; a front member on a front surface of the display panel; a first support on a rear surface of the display panel; a vibration generating module supported by the first support to vibrate the display panel; and a printed circuit board between the rear surface of the display panel and the first support.

In another aspect, there is provided a vehicle comprising a dashboard including a first region facing a driver seat; and an instrument panel module including a first display in the first region of the dashboard; wherein the first display includes a display apparatus including a display panel configured to display an image; a front member on a front surface of the display panel; a driving circuit on a rear surface of the display panel and connected to the display panel; a supporting frame configured to surround a side surface of the display panel and a side surface of the driving circuit; a first support supported by the supporting frame and on the rear surface of the display panel; and a vibration generating module supported by the first support to vibrate the display panel.

In another aspect, there is provided a vehicle comprising a dashboard including a first region facing a driver seat, a second region facing a passenger seat, and a third region between the first region and the second region; an instrument panel module including a first display in the first region of the dashboard; and an infotainment module including a second display in the third region of the dashboard, a third display in the second region of the dashboard, a fourth display on a rear surface of the driver seat, and a fifth display on a rear surface of the passenger seat, wherein at least one of the first to fifth displays includes a display apparatus including a display panel configured to display an image; a front member on a front surface of the display panel; a driving circuit on a rear surface of the display panel and connected to the display panel; a supporting frame configured to surround a side surface of the display panel and a side surface of the driving circuit; a first support supported by the supporting frame and on the rear surface of the display panel; and a vibration generating module supported by the first support to vibrate the display panel.

In another aspect, there is provided a vehicle comprising a dashboard including a display apparatus including a display panel configured to display an image; a front member on a front surface of the display panel; a driving circuit on a rear surface of the display panel and connected to the display panel; a supporting frame configured to surround a side surface of the display panel and a side surface of the driving circuit; a first support supported by the supporting frame and on the rear surface of the display panel; and a vibration generating module supported by the first support to vibrate the display panel.

The display apparatus and the vehicle including the same according to an embodiment of the present disclosure may output sound to a forward region in front of a display panel and may output a sound with improved sound quality, performance, and sound pressure characteristic, thereby increasing an immersion experience of a viewer or listener.

Moreover, the display apparatus and the vehicle including the same according to an embodiment of the present disclosure may prevent or minimize the damage of a driving circuit caused by a vibration of a display panel, thereby enhancing the reliability of the driving circuit.

Moreover, the display apparatus and the vehicle including the same according to an embodiment of the present disclosure may increase the sound pressure level, sound quality, and reproduction band of a sound generated by a vibration of the display panel.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this application, illustrate embodiments of the disclosure and together with the description serve to explain various principles of the disclosure.

DETAILED DESCRIPTION

Figure 1:
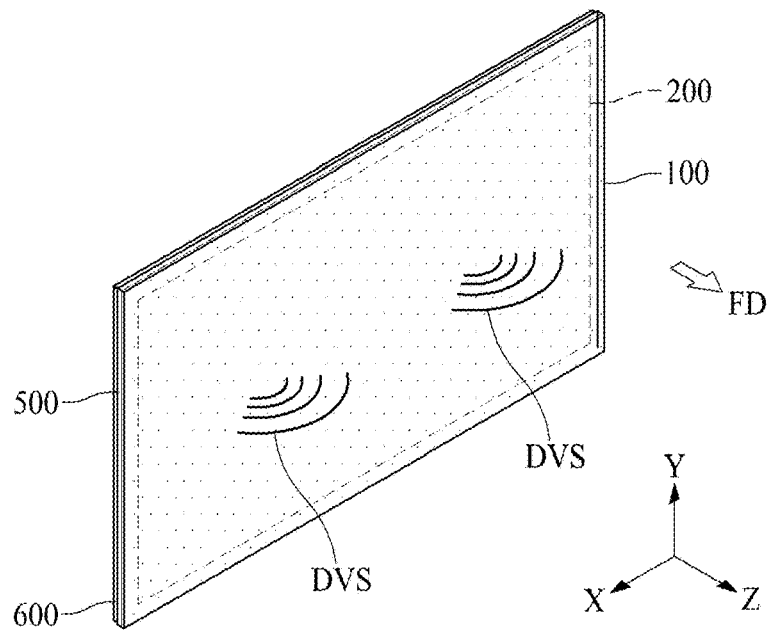
FIG. 1 illustrates a display apparatus according to an embodiment of the present disclosure.

Reference will now be made in detail to embodiments of the present disclosure, examples of which may be illustrated in the accompanying drawings.

Throughout the drawings and the detailed description, unless otherwise described, the same drawing reference numerals should be understood to refer to the same elements, features, and structures. The relative size and depiction of these elements may be exaggerated for clarity, illustration, and convenience.

Advantages and features of the present disclosure, and implementation methods thereof will be clarified through the following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range. In describing a position relationship, for example, when a position relation between two parts is described as, for example, "on," "over," "under," and "next," one or more other parts may be disposed between the two parts unless a more limiting term, such as "just" or "direct(ly)" is used. In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," 'A,' 'B,' '(a),' '(b),' etc. may be used. These terms are intended to identify the corresponding elements from the other elements, and basis, order, or number of the corresponding elements should not limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of a display apparatus and a vehicle including the same according to the present disclosure will be described in detail with reference to the accompanying drawings. In adding reference numerals to elements of each of the drawings, although the same elements are illustrated in other drawings, like reference numerals may refer to like elements. In the following description, when the detailed description of the relevant known function or configuration is determined to unnecessarily obscure the present disclosure, the detailed description may be omitted. Also, for convenience of description, a scale of each of elements illustrated in the accompanying drawings differs from a real scale, and thus, is not limited to a scale illustrated in the drawings.

When a driving circuit of a display apparatus is directly disposed on a rear surface of a display panel, the inventors have recognized a problem where a desired sound is not transferred to the display panel due to the driving circuit in a case which transfers a vibration of a vibration generating module to the display panel. Also, when the vibration generating module is applied to an automotive display apparatus having a relatively small size, the inventors have recognized a problem where the driving circuit is damaged by a vibration of the vibration generating module. Therefore, the inventors have performed various experiments for decreasing to damage to the driving circuit caused by the vibration generating module. Through the various experiments, the inventors have invented a display apparatus having a new structure, which prevents the driving circuit from being damaged by the vibration generating module, decreases a contact between the driving circuit and the display panel to reduce a vibration caused by the driving circuit, and enhances a sound of the vibration generating module.

FIG. 1 illustrates a display apparatus according to an embodiment of the present disclosure.

With reference to FIG. 1, the display apparatus according to an embodiment of the present disclosure may output a sound DVS (or a display vibration sound) according to a vibration of a display panel 200 for displaying an image. Therefore, the display apparatus according to an embodiment of the present disclosure may output the sound DVS using the display panel 200 as a vibration plate. Thus, the display apparatus may output the sound DVS to a forward region FD in front of a screen of the display panel 200, thereby transferring an accurate sound, improving sound quality, and increasing an immersion experience of a viewer or a listener.

Figure 2:
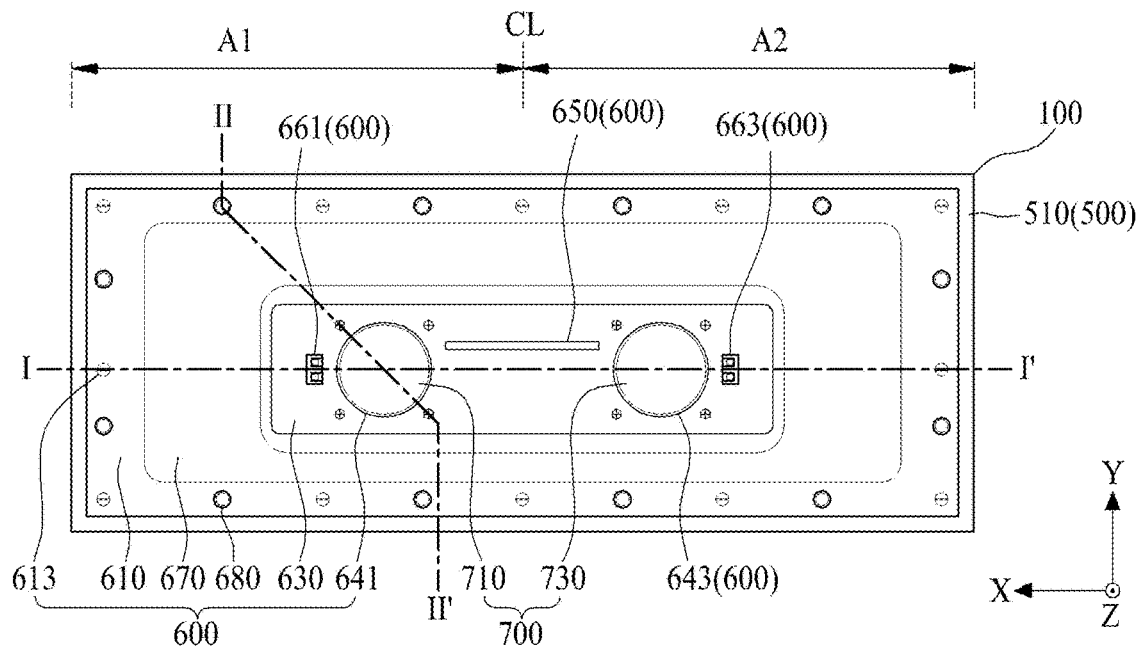
FIG. 2 illustrates a rear surface of a display apparatus illustrated in FIG. 1.
Figure 3:
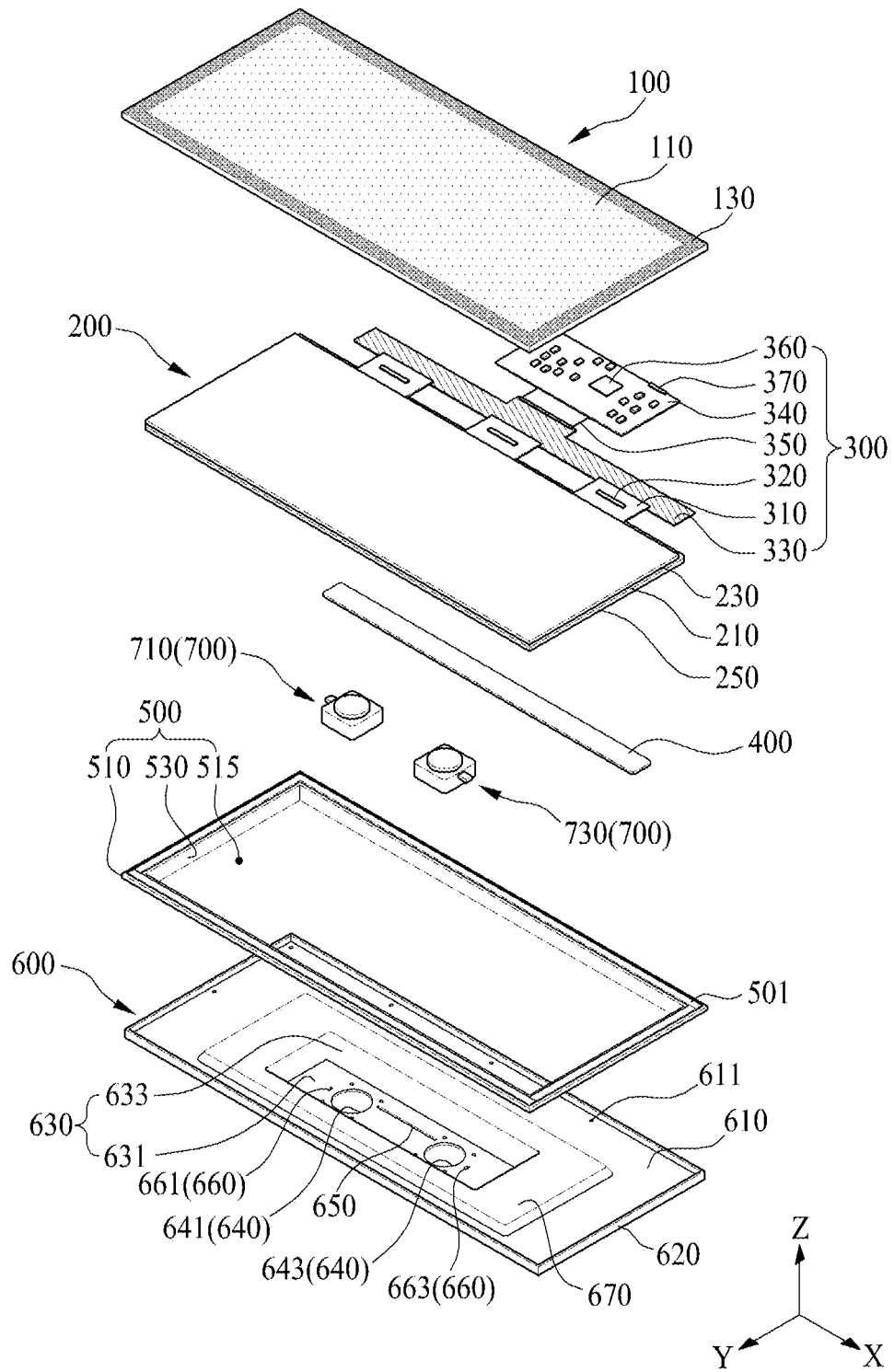
FIG. 3 is an exploded perspective view of the display apparatus illustrated in FIGS. 1 and 2.
Figure 4:
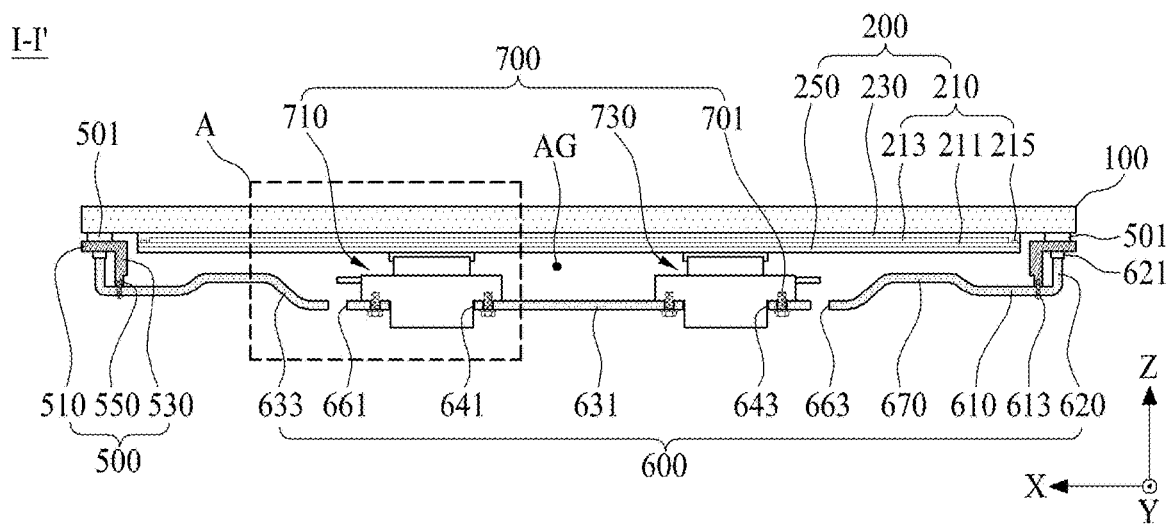
FIG. 4 is a cross-sectional view taken along line I-I' illustrated in FIG. 2.
Figure 5:
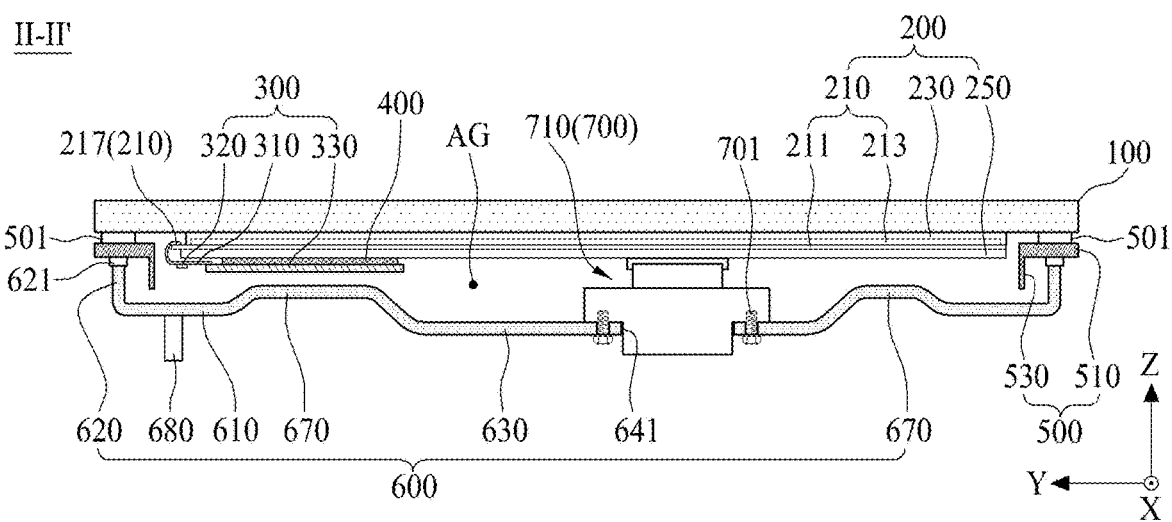
FIG. 5 is a cross-sectional view taken along line II-II' illustrated in FIG. 2.

FIG. 2 illustrates a rear surface of a display apparatus illustrated in FIG. 1. FIG. 3 is an exploded perspective view of the display apparatus illustrated in FIGS. 1 and 2. FIG. 4 is a cross-sectional view taken along line I-I' illustrated in FIG. 2. FIG. 5 is a cross-sectional view taken along line II-IF illustrated in FIG. 2.

With reference to FIGS. 2 to 5, a display apparatus according to an embodiment of the present disclosure may include a front member 100, a display panel 200, a driving circuit 300, a second support 400, a supporting frame 500, a first support 600, and a vibration generating module 700.

The front member 100 may configure a foremost structure of the display apparatus and may protect a screen of the display panel 200. The front member 100 may be disposed (or provided) on a front surface of the display panel 200. For example, the front member 100 may cover (or overlay) the front surface of the display panel 200 to protect the display panel 200 from an external impact. Also, the front member 100 may vibrate along with the vibration of the display panel 200 to generate a sound DVS.

The front member 100 according to an embodiment of the present disclosure may include a transparent plastic material, a glass material, or a tempered glass material. For example, the front member 100 may include one of sapphire glass and gorilla glass or a stacked structure thereof. As another example, the front member 100 may include a transparent plastic material such as polyethyleneterephthalate (PET). The front member 100 may include tempered glass based on a scratch resistance and transparency. For example, the front member 100 may be a "front structure,"

a "front window," a "cover window," a "glass window," a "cover screen," a "screen cover," or a "window glass," but the term is not limited thereto.

With reference to FIG. 3, the front member 100 may cover (or overlay) a non-display area other than a display area of the display panel 200. The front member 100 according to an embodiment of the present disclosure may include a transparent area 110 overlapping the display area of the display panel 200 and a light blocking area 130 overlapping the non-display area of the display panel 200. The light blocking area 130 may cover (or overlay) not only the non-display area of the display panel 200, but also the non-display area where an image is not displayed on the display apparatus.

The front member 100 according to an embodiment of the present disclosure may have a polygonal shape such as a quadrilateral shape (e.g., a rectangular shape or a square shape), or may have a non-polygonal shape including at least one side having a curve shape.

The display panel 200 may be disposed on a rear surface (or a back surface) of the front member 100 and may display an image. The display panel 200 may act as a touch sensor that senses a user touch applied to the front member 100. The display panel 200 may output the sound DVS according (or responding) to a vibration of the vibration generating module 700, or may generate a haptic feedback (or a haptic vibration) responding to the user touch.

The display panel 200 may be disposed on the rear surface of the front member 100 through a bonding process using a panel bonding member (or a transparent adhesive member). The panel bonding member may include a pressure sensitive adhesive (PSA), an optically clear adhesive (OCA), or an optically clear resin (OCR), but is not limited thereto.

The display panel 200 may include a self-emitting display panel or a curved type self-emitting display panel. For example, the display panel 200 may include a light-emitting display panel, a micro light emitting diode display panel, a flexible light-emitting display panel, or a flexible micro light-emitting diode display panel, but is not limited thereto.

The display panel 200 according to an embodiment of the present disclosure may have a polygonal shape such as a quadrilateral shape (e.g., a rectangular shape or a square shape), or may have a non-polygonal shape including at least one side having a curve shape. The display panel 200 may have a shape which is the same as or different from that of the front member 100. For example, the front member 100 may have a quadrilateral shape (e.g., a rectangular shape or a square shape), and the display panel 200 may have a rectangular shape having a size that is less than that of the front member 100. As another example, the front member 100 may have a non-polygonal shape, and the display panel 200 may have a non-polygonal shape or a quadrilateral shape (e.g., a rectangular shape or a square shape) each having a size that is less than that of the front member 100.

With reference to FIG. 4, the display panel 200 according to an embodiment of the present disclosure may include a pixel array substrate 210 including a pixel array layer 213 having a plurality of pixels and an encapsulation layer 230 covering (or overlaying) the pixel array layer 213.

The pixel array substrate 210 may include a base substrate 211 and a pixel array layer 213 disposed on the base substrate 211.

The base substrate 211 may include a plastic material or a glass material.

The pixel array layer 213 may comprise a pixel array including the plurality of pixels provided in the display area on the base substrate 211.

The plurality of pixels may be respectively provided in a plurality of pixel areas defined by a plurality of pixel driving lines including a plurality of gate lines and a plurality of data lines. Each of the plurality of pixels according to an embodiment of the present disclosure may include a pixel circuit, the pixel circuit including at least two thin film transistors (TFTs) and at least one capacitor, and a light-emitting device layer that emits light with a current supplied from the pixel circuit.

The light-emitting device layer in each of the plurality of pixels may include a first electrode connected to a corresponding pixel circuit, a light-emitting device on the first electrode, and a second electrode (or connected to) on the light emitting device. For example, the light-emitting device may include an organic light-emitting layer or a quantum dot light-emitting layer. As another example, the light-emitting device may include a micro light-emitting diode.

The light-emitting device layer according to an embodiment of the present disclosure may have a top emission structure (or a front emission structure) where light emitted from the light-emitting device passes through the encapsulation layer 230 and is transferred (or outputted) toward the front member 100. For example, in the light-emitting device layer based on the top emission structure (or the front emission structure), the first electrode may be a reflective electrode, and the second electrode may be a transparent electrode. For example, the first electrode may include a light reflecting material, and the second electrode may include a light transmitting material.

According to another embodiment of the present disclosure, the light-emitting device layer may have a bottom emission structure (or a lower emission structure) where light emitted from the light-emitting device passes through the pixel array substrate 210 and is transferred (or outputted) toward the front member 100. For example, in the light-emitting device layer based on the bottom emission structure (or the lower emission structure), the first electrode may be a transparent electrode, and the second electrode may be a reflective electrode. The first electrode may include a light transmitting material, and the second electrode may include a light reflecting material. However, embodiments of the present disclosure are not limited thereto, and the light-emitting device layer may have a dual emission structure.

With reference to FIG. 4, the pixel array substrate 210 may further include a gate driving circuit 215 that is disposed in the non-display area of the base substrate 211.

The gate driving circuit 215 may be disposed in the non-display area of the base substrate 211 and may be connected to the plurality of gate lines. The gate driving circuit 215 may be disposed in at least one of a left non-display area and a right non-display area of the base substrate 211. For example, the gate driving circuit 215 may be implemented with a shift register including a plurality of transistors in the non-display area through a process of forming a TFT in each of the plurality of pixel areas. In this case, the gate driving circuit 215 may be a built-in gate driving circuit or a built-in gate driver, but the term is not limited thereto.

With reference to FIGS. 3 to 5, the encapsulation layer 230 may be on the pixel array substrate 210 to surround the pixel array layer 213, and thus, may prevent or block penetration of oxygen and/or water into the light-emitting device of the pixel array layer 213.

The encapsulation layer 230 according to an embodiment of the present disclosure may be a multi-layer structure where an organic material layer and an inorganic material layer are alternately stacked, but is not limited thereto. The inorganic material layer may prevent or block penetration of oxygen and/or water into the light-emitting device. Also, the organic material layer may have a thickness which is thicker than that of the inorganic material layer, so as to cover particles occurring in a manufacturing process, but is not limited thereto.

The display panel 200 according to an embodiment of the present disclosure may further include a protection substrate on the encapsulation layer 230. The protection substrate (or an encapsulation substrate) may be disposed on or coupled to a front surface of the encapsulation layer 230 by a filler or an adhesive. For example, when the light-emitting device layer has the top emission structure, the protection substrate may include a transparent material. As another example, when the light-emitting device layer has the bottom emission structure, the protection substrate may include a transparent material, an opaque material, or a metal material. For example, when the light-emitting device layer has the top emission structure, the protection substrate may be omitted.

The display panel 200 according to an embodiment of the present disclosure may further include an optical film.

The optical film may be a polarizing film that prevents or minimizes reflection of external light to enhance the visibility and contrast ratio of the display panel 200. The polarizing film may circularly polarize the external light reflected by the TFT and/or the pixel driving lines on the pixel array substrate 210, thereby preventing or minimizing reflection of the external light.

When the light-emitting device layer has the top emission structure, the optical film according to an embodiment of the present disclosure may be disposed (or attached) on an upper surface (or a front surface) of the encapsulation layer 230 by a transparent adhesive member. When the display panel 200 includes the optical film, the protection substrate may be omitted.

According to another embodiment of the present disclosure, when the light-emitting device layer has the bottom emission structure, the optical film may be disposed (or attached) on a rear surface of the pixel array substrate 210 by a transparent adhesive member.

The display panel 200 according to an embodiment of the present disclosure may further include a touch electrode layer for sensing a user touch applied to the front member 100.

The touch electrode layer may include a plurality of touch electrodes for sensing the user touch. Each of the plurality of touch electrodes may act as a touch sensor for sensing the user touch, based on a mutual capacitance type or a self-capacitance type.

The touch electrode layer according to an embodiment may be implemented as a touch panel including the plurality of touch electrodes. For example, when the light-emitting device layer has the top emission structure, an add-on type touch panel may be disposed on or coupled to the encapsulation layer 230 or the optical film, and when the light-emitting device layer has the bottom emission structure, the add-on type touch panel may be disposed on or coupled to the rear surface of the pixel array substrate 210.

According to another embodiment of the present disclosure, the touch electrode layer may be directly on the encapsulation layer 230, based on an in-cell type. For example, when the light-emitting device layer has the top emission structure, an in-cell type touch electrode layer may be directly on the front surface of the encapsulation layer 230.

The display panel 200 according to an embodiment of the present disclosure may further include a color filter layer on the encapsulation layer 230 to overlap each of the plurality of pixels. The light-emitting device in each of the plurality of pixels may emit white light. For example, when the light-emitting device layer has the top emission structure, the color filter layer may be on the encapsulation layer 230. As another example, when the light-emitting device layer has the bottom emission structure, the color filter layer may be in the pixel array layer 213.

The display panel 200 according to an embodiment of the present disclosure may further include a back plate 250.

The back plate 250 may have the same shape as that of the pixel array substrate 210. For example, when the light-emitting device layer has the top emission structure, the back plate 250 may be on the rear surface (or a backside) of the pixel array substrate 210 by a transparent adhesive member. As another example, when the light-emitting device layer has the bottom emission structure, the back plate 250 may be a protection substrate.

The back plate 250 may increase stiffness of the display panel 200 and may dissipate heat that occurs in the display panel 200. The back plate 250 according to an embodiment of the present disclosure may include a metal material that is high in thermal conductivity. For example, the back plate 250 may include one of aluminum (Al), copper (Cu), silver (Ag), and magnesium (Mg) or an alloy thereof, or may include a stainless steel material. The back plate 250 may be a heat diffusion sheet, a heat diffusion layer, a heat diffusion plate, a heat sink, a heat dissipation sheet, a heat dissipation layer, or a heat dissipation plate, but the term is not limited thereto.

With reference to FIGS. 2, 3, and 5, the driving circuit 300 may be on the rear surface of the display panel 200 and may be connected to the display panel 200. For example, the driving circuit 300 may be connected to a pad part 217 provided at the first periphery portion (or one periphery portion) of the display panel 200. The driving circuit 300 may be implemented to display an image on the plurality of pixels on the pixel array substrate 210 of the display panel 200. For example, the driving circuit 300 may display an image on the display area of the display panel 200. The driving circuit 300 may sense a user touch through the plurality of touch electrodes disposed on the touch electrode layer of the display panel 200.

The driving circuit 300 according to an embodiment of the present disclosure may include at least one flexible circuit film 310, at least one data driving integrated circuit (IC) 320, and a printed circuit board (PCB) 330. For example, the driving circuit 300 may include the at least one flexible circuit film 310, a plurality of data driving ICs, 320 and a PCB 330.

The at least one flexible circuit film 310 may be connected to a plurality of pad parts 217 provided at a first periphery portion (or one periphery portion) of the pixel array substrate 210 of the display panel 200. The plurality of pad parts 217 may be arranged by certain intervals in the first direction X. Therefore, the at least one flexible circuit film 310 may be connected to the plurality of pad parts 217 arranged at certain intervals, and thus, may be arranged by certain intervals in the first direction X. For example, the at least one flexible circuit film 310 may be disposed in the pad part 217 in the display panel 200 through a film attaching process using an anisotropic conductive film.

The at least one flexible circuit film 310 may surround the rear surface of the display panel 200. The at least one flexible circuit film 310 may be bent (or folded) from the pad part 217 to the rear surface of the display panel 200. For example, the other side of the at least one flexible circuit film 310 may be disposed at a first rear periphery portion (or a first region) of the display panel 200. A middle portion (or a bending portion) between the one side and the other side of the at least one flexible circuit film 310 may be bent (or folded) to surround one surface of the display panel 200.

The plurality of data driving ICs 320 may be respectively mounted on the at least one flexible circuit films 310 or may be respectively mounted on the plurality of flexible circuit films 310. Each of the plurality of data driving ICs 320 may be mounted on a corresponding flexible circuit film 310 through a chip bonding process or a surface mounting process. Each of the plurality of data driving ICs 320 may convert input digital pixel data into an analog data signal based on a data control signal supplied from the outside and may supply the analog data signal to a corresponding pixel.

The PCB 330 may be connected to the at least one flexible circuit film 310 in common. The PCB 330 may be electrically connected to the other side of the at least one flexible circuit film 310 through a film attaching process using an anisotropic conductive film and may be disposed on the first rear periphery portion of the display panel 200, based on bending of the at least one flexible circuit film 310. The first rear periphery portion of the display panel 200 may be a region of the rear surface of the display panel 200 in which the at least one flexible circuit film 310 and the PCB 330 are disposed. For example, the first rear periphery portion of the display panel 200 may be one rear portion of the display panel 200. The PCB 330 may be between the rear surface of the display panel 200 and the first support 600. The PCB 330 according to an embodiment of the present disclosure may be spaced apart or floated from the rear surface of the display panel 200, and thus, may not directly contact the rear surface of the display panel 200. For example, a rear surface of the PCB 330 may be placed without contacting the back plate 250 of the display panel 200.

For example, when the display apparatus according to an embodiment of the present disclosure is applied to an automotive display apparatus having a size that is relatively less than that of a display apparatus for large-screen televisions (TVs), a size of the PCB 330 on the rear surface of the display panel 200 may correspond to about 20% to 30% of a size of the display panel 200, and the PCB 330 may be placed or disposed in a vibration region of the display panel 200 based on a vibration of the vibration generating module 700. Therefore, in a case where the PCB 330 is disposed to directly contact the rear surface of the display panel 200, as a vibration of the display panel 200 for a sound DVS is directly transferred to the PCB 330, the PCB 330 may be damaged, or detachment between the PCB 330 and the flexible circuit film 310 may occur due to the vibration of shaking of the PCB 330, and the data driving IC 320 may be damaged due to the vibration of shaking of the flexible circuit film 310 caused by the vibration of shaking of the PCB 330. Therefore, in the display apparatus according to an embodiment of the present disclosure, the PCB 330 may be between the rear surface of the display panel 200 and the first support 600 so as not to directly contact the rear surface of the display panel 200. This may thereby prevent or minimize the transfer of the vibration of the display panel 200 to the PCB 330, thereby preventing or minimizing the damage to the PCB 330 caused by the vibration of the display panel 200, preventing or minimizing detachment between the flexible circuit film 310 and the PCB 330, and preventing or minimizing the damage to the data driving IC 320.

The driving circuit 300 according to an embodiment of the present disclosure may include a control board 340, a signal transfer member 350, a timing control circuit 360, and a user connector 370.

The control board 340 may be disposed on a rear surface of the first support 600 and may be connected to the PCB 330 through the signal transfer member 350. The control board 340 may be connected to a display host system (or a display driving system) through the user connector 370. The control board 340 may supply the timing control circuit 360 with a timing synchronization signal and video data each supplied from the display host system and may supply digital pixel data, output from the timing control circuit 360, to the data driving IC 320 through the signal transfer member 350, the PCB 330, and the flexible circuit film 310.

The control board 340 may further include a voltage generating circuit that generates various driving voltages needed for driving of the display apparatus.

The timing control circuit 360 may be mounted on the control board 340 and may receive the timing synchronization signal and the video data each supplied from the display host system through the user connector 370. For example, the timing synchronization signal may include a vertical synchronization signal, a horizontal synchronization signal, a data enable signal, and a main clock signal.

The timing control circuit 360 may generate a gate control signal for controlling a driving timing of a gate driving circuit and a data control signal for controlling a driving timing of each of the plurality of data driving ICs 320 based on the timing synchronization signal. For example, the gate control signal may include at least one gate start signal and a plurality of gate shift clocks. The data control signal may include a source start signal, a source shift clock, and a source output enable signal.

The timing control circuit 360 may be mounted on a front surface of the PCB 330 instead of the control board 340. Also, the voltage generating circuit may be mounted on the front surface of the PCB 330 instead of the control board 340. In this case, the control board 340 may be omitted.

The driving circuit 300 according to an embodiment of the present disclosure may further include a touch driving circuit connected to the touch electrode layer of the display panel 200.

The touch driving circuit may sense a user touch through each of the plurality of touch electrodes disposed on the touch electrode layer to generate touch raw data and may transmit coordinate information about the user touch to the display host system based on the generated touch raw data.

The display host system may include a main board, various circuits mounted on the main board, various storage mediums, a peripheral device, a keyboard, and a power device. The various circuits mounted on the main board may include a central control circuit for processing various information, an image processing circuit for processing data according to control by the central control circuit, and a sound processing circuit for processing a sound according to control by the central control circuit. The display host system may process various information, generate the timing synchronization signal and the video data to provide the timing synchronization signal and the video data to the control board 340, and may generate a driving signal including a sound signal or a haptic feedback signal to provide the driving signal to the control board 340. For example, the sound signal may be synchronized with the video data, or may not be synchronized with the video data.

The display host system may execute an application program associated with touch coordinates corresponding to coordinate information about a user touch provided from the touch driving circuit, or may perform a user interface based on touch drawing of a user. Also, the display host system may generate a driving signal including a haptic feedback signal corresponding to the coordinate information about the user touch provided from the touch driving circuit.

The second support 400 may be disposed (or connected) between the rear surface of the display panel 200 and the driving circuit 300. The second support 400 may be disposed (or connected) between the rear surface of the display panel 200 and the PCB 330 of the driving circuit 300. The second support 400 may support the PCB 330 to separate the PCB 330 from the rear surface of the display panel 200. For example, the PCB 330 may be supported by the second support 400 and may be disposed between the rear surface of the display panel 200 and the first support 600.

A first surface (or a front surface) of the second support 400 may be disposed (or connected) on the rear surface of the display panel 200, and a second surface (or a rear surface) opposite to the first surface (or the front surface) of the second support 400 may be disposed (or connected) on the rear surface of the PCB 330. For example, the first surface (or the front surface) of the second support 400 may be disposed (or connected) on the back plate 250, which is a rearmost surface of the display panel 200. Therefore, the PCB 330 may be supported by the second support 400 and may be disposed (or connected) on the rear surface of the display panel 200 using the second supporting member 400.

The second support 400 according to an embodiment of the present disclosure may include a vibration absorbing material, which blocks or minimizes the transfer of a vibration of the display panel 200 to the PCB 330, or an elastic material capable of being compressed to a certain degree. For example, the second support 400 may include a double-sided tape or a double-sided foam tape each including a vibration absorbing layer (or an elastic layer), but is not limited thereto.

According to another embodiment of the present disclosure, the second support 400 may include a double-sided conductive tape or a double-sided conductive foam tape. In this case, the PCB 330 may include a ground pattern exposed at the rear surface thereof. For example, the second surface (or the rear surface) of the second support 400 may be electrically connected to the ground pattern exposed at the rear surface of the PCB 330 and may electrically connect the back plate 250 of the display panel 200 to the ground pattern exposed at the rear surface of the PCB 330. Accordingly, the back plate 250 of the display panel 200 may perform a heat dissipation function of the display panel 200 and a function of grounding the ground pattern of the PCB 330.

The supporting frame 500 may be on the rear surface of the front member 100. For example, the supporting frame 500 may surround side surfaces of the display panel 200 or a side surface of the driving circuit 300. For example, the supporting frame 500 may surround the side surfaces of the display panel 200 and the side surface of the driving circuit 300. The supporting frame 500 may accommodate the driving circuit 300 of the display panel 200. The supporting frame 500 may have the same shape as that of the front member 100. The supporting frame 500 may be on an outermost side surface of the display apparatus and may be directly exposed at the outside of the display apparatus. For example, the supporting frame 500 may be an "outermost frame," an "outermost mold material," an "outermost mechanism," a "guide frame," a "guide panel," an "edge frame," or a "mold frame," but the term is not limited thereto.

The supporting frame 500 may support the first support 600 and may provide an air gap AG between the rear surface of the display panel 200 and the first support 600, or may provide an accommodating space or a storing space of the display panel 200.

The supporting frame 500 may be disposed at a rear periphery portion of the front member 100 by a first connection member (or a first coupling member) 501.

The first connection member 501 may be disposed (or connected) between the rear periphery portion of the front member 100 and the supporting frame 500, and thus, the supporting frame 500 may be disposed on (or connected to) the rear surface of the front member 100. The first connection member 501 according to an embodiment of the present disclosure may include adhesive resin, a double-sided tape having an adhesive layer, or a double-sided foam pad having the adhesive layer, but is not limited thereto. In the first connection member 501 according to an embodiment of the present disclosure, the adhesive resin or the adhesive layer may include an acryl-based or urethane-based adhesive material, but are not limited thereto. For example, in the first connection member 501 according to an embodiment of the present disclosure, the adhesive resin or the adhesive layer may include a urethane-based adhesive material, which has a relatively ductile characteristic, rather unlike an acryl-based adhesive material having a characteristic, which is relatively high in hardness, for preventing or minimizing the transfer of a vibration of the front member 100 to the supporting frame 500.

The supporting frame 500 according to an embodiment of the present disclosure may include a frame portion 510 and a frame side portion 530.

The frame portion 510 may be disposed on the rear surface of the front member 100. For example, the frame portion 510 may include an opening 515, which is disposed at the rear periphery portion of the front member 100 to overlap the display panel 200. The frame portion 510 may be disposed at the rear periphery portion of the front member 100. For example, the frame portion 510 may have the same shape as that of the front member 100, but is not limited thereto. For example, the frame portion 510 may have a polygonal shape or a non-polygonal shape, which is the same as that of the front member 100.

The opening 515 of the frame portion 510 may be defined by an inner surface of the frame portion 510. The opening 515 of the frame portion 510 may accommodate the display panel 200. The opening 515 of the frame portion 510 may have the same shape as that of the display panel 200 and may have a size that is greater than that of the display panel 200. The opening 515 of the frame portion 510 may have a polygonal shape or a non-polygonal shape, which is the same as that of the display panel 200.

The frame side portion 530 may be disposed at an inner periphery portion of the frame portion 510. For example, the frame side portion 530 may be vertically disposed at or protrude from the inner periphery portion of the frame portion 510. The opening 515 may be further provided in the frame side portion 530. For example, the frame portion 510 and the frame side portion 530 may each have a cross-sectional structure having a "┐┌"-shape. The frame side portion 530 may surround the side surfaces of the display panel 200 and/or the driving circuit 300 of the display panel 200.

The supporting frame 500 according to an embodiment of the present disclosure, as illustrated in FIG. 4, may further include a plurality of connection portions 550, which are arranged at certain intervals on an outer sidewall of the frame side portion 530. Each of the plurality of connection portions 550 may be a structure for placing (or connecting) the first support 600 in (or to) the supporting frame 500 and may protrude from the outer sidewall of the frame side portion 530. For example, each of the plurality of connection portions 550 may include a hole. For example, the hole may be a screw hole, but is not limited thereto.

With reference to FIGS. 2 to 5, the first support 600 may be on the rear surface of the display panel 200. For example, the first support 600 may be supported by a periphery portion of the supporting frame 500 and may cover (or overlay) the rear surface of the display panel 200. The first support 600 may support or accommodate (or store) the vibration generating module 700. The first support 600 may be have the same shape as that of the display panel 200 and may be supported by the supporting frame 500.

The first support 600 according to an embodiment of the present disclosure may act as a supporter for supporting the vibration generating module 700, and thus, may include a metal material or a metal alloy material. For example, the first support 600 may include one material of Al, an Al alloy, a Mg alloy, an iron-nickel (Fe—Ni) alloy, and stainless steel, or an alloy thereof or may have a junction structure, but is not limited thereto. For example, the first support 600 may have a thickness of 0.5 mm or more, but is not limited thereto. The first support 600 may be a "supporting member," a "rear cover," a "back cover," or a "rear member," but the term is not limited thereto.

According to another embodiment of the present disclosure, the first support 600 may have a thickness of 0.5 mm or less, for decreasing a weight of the display apparatus. In this case, because the stiffness of the first support 600 is weak due to having a relatively thin thickness compared to the front member 100, distortion of the first support 600 may occur due to a vibration of the vibration generating module 700. Due to this, the vibration of the vibration generating module 700 may not normally be transferred to the front member 100. When the first support 600 does not have sufficient stiffness, the inventors have recognized a problem where the first support 600 absorbs a portion of energy of the vibration generating module 700. For example, because the first support 600 absorbs the energy of the vibration generating module 700, an insufficient vibration equal to energy absorbed by the first support 600 may be transferred to the display panel 200. Therefore, due to an insufficient vibration of the vibration generating module 700, it may be difficult for the display panel 200 to output a sufficient sound. For this reason, when the energy or vibration of the vibration generating module 700 is lost, the inventors have recognized a problem where it is difficult for the display panel 200 to output a desired sound. Therefore, the inventors have performed various experiments for increasing or reinforcing stiffness of the first support 600. Another structure may be additionally provided in the first support 600 to increase stiffness of the first support 600, but in this case, there may be a problem where the display apparatus is thickened. Through the various experiments, the inventors have provided a forming portion (or an accommodating portion or a stiffness reinforcement structure) in the first support 600, for increasing or reinforcing stiffness of the first support 600 without any increase in thickness of the display apparatus. Also, the display apparatus according to an embodiment of the present disclosure may further include at least one reinforcement portion for reinforcing stiffness of the first support 600. For example, the at least one reinforcement portion may further include a reinforcement bar or a stiffness reinforcement structure. This will be described below.

The first support 600 according to an embodiment of the present disclosure may include a first plate 610, a side portion 620, and a forming portion 630.

The first plate 610 (or a supporting plate) may be disposed on the rear surface of the display panel 200. For example, the first plate 610 may be disposed to face the rear surface (or a backside) of the display panel 200 and may cover (or overlay) the rear surface of the display panel 200. The first plate 610 may be disposed at (or supported by) the frame side portion 530 of the supporting frame 500 by a plurality of first connection members 613. Each of the first connection members 613 may be a screw or a bolt, but is not limited thereto.

Each of the plurality of first connection members 613 may pass through a corresponding hole 611 of a plurality of holes 611 along an periphery portion of the first plate 610 and may be disposed at (or connected to) a corresponding connection portion 550 of the plurality of connection portions 550 provided at the frame side portion 530 of the supporting frame 500, thereby placing (or connecting) the first plate 610 at (or to) the supporting frame 500. The first plate 610 may be disposed at (or connected to) or supported by the frame side portion 530 of the supporting frame 500 using the plurality of first connection members 613. Therefore, the first plate 610 and the supporting frame 500 may each include a four-surface supporting structure, and thus, four surfaces (or upper, lower, left, and right surfaces) of each of the front member 100, the supporting frame 500, and the first support 600 may have the same stiffness. Therefore, because each of the first plate 610 and the first support 600 has the four-surface supporting structure where the four surfaces (or upper, lower, left, and right sides) thereof are all supported by the supporting frame 500, the four surfaces (or upper, lower, left, and right periphery portions) of each of the front member 100, the supporting frame 500, and the first support 600 may have the same stiffness. Accordingly, a primary vibration mode of the display panel 200 may be provided near the vibration generating module 700, and a vibration region of the vibration generating module 700 may match a maximum displacement position of the display panel 200, thereby enhancing the vibration efficiency of the vibration generating module 700 to enhance the sound pressure level, quality, and reproduction band of a sound generated by a vibration of the display panel 200.

The side portion 620 (or a supporting side portion) may be bent from the periphery portion of the first plate 610. The side portion 620 may increase the stiffness of the first support 600 and may provide an accommodating (or storing) space, for accommodating the frame side portion 530 of the supporting frame 500, on the first plate 610.

The side portion 620 may be on a rear surface of the supporting frame 500. For example, the side portion 620 may be disposed at a rear periphery portion of the supporting frame 500 using a second connection member (or a second coupling member) 621. For example, the side portion 620 may be disposed at or connected to the frame portion 510 of the supporting frame 500 through the second connection member 621.

The second connection member 621 may be between the side portion 620 and the frame portion 510 of the supporting frame 500 and may place, connect, or couple the side portion 620 at or to the frame portion 510 of the supporting frame 500. The second connection member 621 according to an embodiment of the present disclosure may include adhesive resin, a double-sided tape having an adhesive layer, or a double-sided foam pad having the adhesive layer, but is not limited thereto. The adhesive resin or the adhesive layer of the second connection member 621 according to an embodiment may include an acryl-based or urethane-based adhesive material, but are not limited thereto. For example, the adhesive resin or the adhesive layer of the second connection member 621 may include a urethane-based adhesive material, which has a relatively ductile characteristic rather unlike an acryl-based adhesive material having a characteristic that is relatively high in hardness. Thus, the urethane-based adhesive material may prevent or minimize the transfer of a vibration from the first support 600 to the supporting frame 500 based on a vibration of the vibration generating module 700, but embodiments of the present disclosure are not limited thereto.

The forming portion 630 may be disposed on (or connected to) the first plate 610. The forming portion 630 may support the vibration generating module 700. The forming portion 630 may be provided (or connected) to be concave or convex from the first plate 610. The forming portion 630 may increase or reinforce stiffness of the first support 600. For example, the forming portion 630 may be provided to be concave from the first plate 610, for reducing or minimizing an increase in thickness (or height) of the display apparatus caused by a thickness (or a height) of the vibration generating module 700 and slimming the display apparatus. However, the shape is not limited thereto.

The forming portion 630 may be concavely provided (or connected) to have a tetragonal shape from a front surface of the first plate 610 facing the rear surface of the display panel 200. The forming portion 630 may protrude from the first plate 610 in a rearward direction opposite to a forward direction toward the rear surface of the display panel 200, and thus, may be concavely provided on (or connected to) the first plate 610. However, the present disclosure is not limited thereto. The forming portion 630 may be a "first forming portion," a "groove portion," a "concave portion," a "protrusion portion," an "engraved portion," an "accommodating portion," or a "stiffness reinforcement portion."

The forming portion 630 according to an embodiment of the present disclosure may include a bottom surface 631 facing the rear surface of the display panel 200 and an inclined surface 633 between the first plate 610 and the bottom surface 631. The inclined surface 633 may provide an accommodating space (or a supporting space) on the bottom surface 631 and may increase or reinforce stiffness of the first support 600 as well as stiffness of the first plate 610.

The first support 600 according to an embodiment of the present disclosure may further include a hole 640 in the forming portion 630. The hole 640 may be provided in the forming portion 630 to have a size and a shape each enabling a portion of a rear surface of the vibration generating module 700 to be inserted or accommodated thereinto.

The hole 640 according to an embodiment of the present disclosure may include a first hole 641 in a first region of the forming portion 630 and a second hole 643 in a second region of the forming portion 630 in parallel with the first hole 641.

The first hole 641 may be provided to pass through the first region of the forming portion 630 overlapping a first rear region A1 of the display panel 200. For example, the first rear region A1 of the display panel 200 may be one region (or a left region) of the display panel 200 with respect to a center line (or a horizontal-length center line) CL of the display panel 200 parallel to a first direction X.

The second hole 643 may be provided to pass through the second region of the forming portion 630 overlapping a second rear region A2 of the display panel 200. For example, the second rear region A2 of the display panel 200 may be the other region (or a right region) of the display panel 200 with respect to the center line CL of the display panel 200.

The first hole 641 and the second hole 643 according to an embodiment of the present disclosure, as illustrated in FIGS. 2 and 3, may each have a circular shape, but are not limited thereto. For example, the first hole 641 and the second hole 643 may each have an oval shape or a polygonal shape, or may have a shape enabling a portion of the rear surface of the vibration generating module 700 to be inserted or accommodated thereinto.

The first support 600 according to an embodiment of the present disclosure may further include a cable hole 650 and a line hole 660 in the forming portion 630.

The cable hole 650 may be in the forming portion 630 between the first hole 641 and the second hole 643. The cable hole 650 may have a size and a shape each enabling the signal transfer member 350, electrically connecting the PCB 330 to the control board 340, to pass through the cable hole 650. One portion of the signal transfer member 350 may be connected to the PCB 330 between the rear surface of the display panel 200 and the first support 600, and the other portion of the signal transfer member 350 may pass through the cable hole 650, may be unloaded to the rear surface of the first support 600, and may be connected to the control board 340.

The line hole 660 may be in the bottom surface 631 of the forming portion 630 adjacent to the hole 640. The line hole 660 may have a size and a shape each enabling a driving signal cable of the vibration generating module 700, disposed between the rear surface of the display panel 200 and the first support 600, to be unloaded to the outside through the line hole 660. The line hole 660 according to an embodiment may include a first line hole 661 in the bottom surface 631 of the forming portion 630 adjacent to the first hole 641 and a second line hole 663 in the bottom surface 631 of the forming portion 630 adjacent to the second hole 643.

The first support 600 according to an embodiment of the present disclosure may further include a second forming portion 670.

The second forming portion 670 according to an embodiment of the present disclosure may be on the first plate 610. For example, the second forming portion 670 may protrude from a center portion except a periphery portion of the first plate 610 toward the rear surface of the display panel 200. The second forming portion 670 may protrude to have an inclined surface from the center portion except the periphery portion of the first plate 610 toward the rear surface of the display panel 200, and thus, may reinforce stiffness of the first plate 610. The second forming portion 670 may support the forming portion 630 (or a first forming portion 630). Therefore, the forming portion 630 may be provided (or connected) to be concave from the second forming portion 670. For example, the second forming portion 670 may be an "auxiliary forming portion," a "groove portion," a "concave portion," a "protrusion portion," an "engraved portion," an "accommodating portion," a "storing portion," or a "stiffness reinforcement portion," but the term is not limited thereto. Therefore, stiffness of the first support 600 may be increased due to a double reinforcement structure including the forming portion 630 and the second forming portion 670.

According to another embodiment of the present disclosure, the second forming portion 670 may protrude from the center portion except the periphery portion of the first plate 610 in a direction toward a rear surface (or a back surface) of the first support 600 opposite to a direction toward the rear surface of the display panel 200, thereby reinforcing stiffness of the first plate 610. The forming portion 630 may be concavely or convexly provided at the second forming portion 670.

The first support 600 according to an embodiment of the present disclosure may further include a plurality of supporting portions 680. The plurality of supporting portions 680 may each be a "supporting pin," a "bracket," or a "prop portion," but the term is not limited thereto.

The plurality of supporting portions 680 may be on a rear surface of the first plate 610. For example, each of the plurality of supporting portions 680 may be along a rear periphery portion of the first plate 610. Each of the plurality of supporting portions 680 may be disposed at a rest or a separate structure each supporting the display apparatus. Therefore, the display apparatus according to an embodiment of the present disclosure may be supported by or disposed at the rest or the separate structure using the plurality of supporting portions 680.

With reference to FIGS. 2 to 5, the vibration generating module 700 may be disposed (or connected) between the first support 600 and the display panel 200. The vibration generating module 700 may be supported by the first support 600 and may vibrate the display panel 200. The vibration generating module 700 may vibrate based on a driving signal including a sound signal or a haptic feedback signal to directly vibrate the display panel 200, and thus, may output a sound DVS based on the vibration of the display panel 200 or may generate a haptic feedback (or a haptic vibration) responding to a user touch.

The vibration generating module 700 may be implemented as a sound generating device including a coil (or a voice coil) and a magnet. The vibration generating module 700 according to an embodiment may include a bobbin and a coil wound around the bobbin, and the bobbin may contact the rear surface of the display panel 200.

The vibration generating module 700 may include one sound generator or a plurality of sound generators 710 and 730. The sound generators 710 and 730 may be disposed in or accommodated (or stored) into the forming portion 630 in the first support 600 and may vibrate the display panel 200. For example, the sound generators 710 and 730 may each include a bobbin and a coil wound around the bobbin, and the bobbin may contact the rear surface of the display panel 200.

The vibration generating module 700 according to an embodiment of the present disclosure may include a first sound generator 710 for vibrating a first rear surface of the display panel 200 and a second sound generator 730 for vibrating a second rear surface of the display panel 200.

The first sound generator 710 may be supported by or accommodated (or stored) into the forming portion 630 in the first support 600 and may be on the first rear surface of the display panel 200. The first sound generator 710 may vibrate based on a first driving signal including a sound signal or a haptic feedback signal to directly vibrate the first rear surface of the display panel 200, and thus, may generate a sound DVS based on the vibration of the display panel 200 or may generate a haptic feedback (or a haptic vibration) responding to a user touch. For example, a portion of a rear surface of the first sound generator 710 may be inserted or accommodated into the first hole 641 in the first region of the forming portion 630, thereby decreasing a thickness of the display apparatus.

The second sound generator 730 may be supported by or accommodated (or stored) into the second region of the forming portion 630 provided in the first support 600 and may be on the second rear surface of the display panel 200. The second sound generator 730 may vibrate according to a second driving signal including a sound signal or a haptic feedback signal to directly vibrate the second rear surface of the display panel 200, and thus, may generate a sound DVS by the vibration of the display panel 200, or may generate a haptic feedback (or a haptic vibration) responding to the user touch. For example, a portion of a rear surface of the second sound generator 730 may be inserted or accommodated (or stored) into the second hole 643 in the second region of the forming portion 630, thereby decreasing a thickness of the display apparatus.

The first driving signal and the second driving signal may be the same or differ. For example, the first driving signal may include a left sound signal or a first haptic feedback signal corresponding to a first region (or a left region) A1 of the display panel 200. The second driving signal may include a right sound signal or a second haptic feedback signal corresponding to a second region (or a right region) A2 of the display panel 200.

Each of the first and second sound generators 710 and 730 may be disposed at the first support 600 and may be symmetrical with respect to the center line (or the horizontal-length center line) CL of the display panel 200, and may include substantially the same structure as each other. The first and second sound generators 710 and 730 may be a "vibration unit," an "actuator," an "exciter," or a "transducer," but the term is not limited thereto.

Therefore, the display apparatus according to an embodiment of the present disclosure may output sound to a forward region FD in front of the display panel 200 using the display panel 200 as a vibration plate for generating a sound DVS, thereby improving sound quality and increasing an immersion experience of a viewer.

In the display apparatus according to an embodiment of the present disclosure, the PCB 330 connected to the display panel 200 may be between the display panel 200 and the first support 600 and may be spaced apart from the rear surface of the display panel 200, thereby preventing or minimizing the damage of the PCB 330 caused by the vibration of the display panel 200.

Moreover, the display apparatus according to an embodiment of the present disclosure may have a four-surface supporting structure where four surfaces (up, down, left, and right) of each of the front member 100 and the first support 600 are all supported by the supporting frame 500, the primary vibration mode generated according to a vibration of the vibration generating module 700 may be provided near the vibration generating module 700, and the vibration region of the vibration generating module 700 may match the maximum displacement position of the display panel 200, thereby enhancing the vibration efficiency of the vibration generating module 700 to enhance the sound pressure level, quality, and reproduction band of a sound generated by a vibration of the display panel 200. For example, the display apparatus according to an embodiment of the present disclosure may output a sound of 100 Hz to 20 kHz at a sound pressure level of 65 dB or more based on the vibration of the display panel 200, and for example, may output sound of 150 Hz to 20 kHz at a sound pressure level of 75 dB or more.

Figure 6:
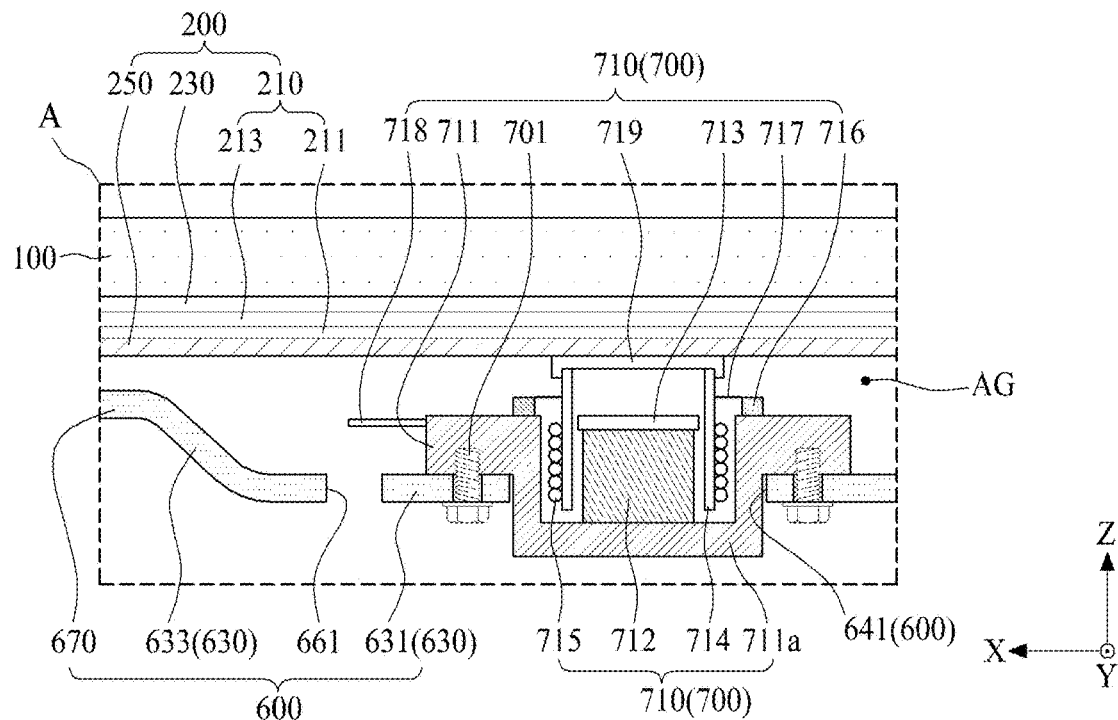
FIG. 6 is an enlarged view of a portion 'A' illustrated in FIG. 4.

FIG. 6 is an enlarged view of a portion 'A' illustrated in FIG. 4 and is a diagram for describing a first sound generator 710 of a vibration generating module 700 according to an embodiment of the present disclosure.

With reference to FIGS. 4 and 6, the first sound generator 710 of the vibration generating module 700 according to an embodiment of the present disclosure may be configured to vibrate the display panel 200 with a current of a driving signal including a sound signal or a haptic feedback signal each applied thereto based on Fleming's Left Hand Rule for Motors.

The first sound generator 710 according to an embodiment of the present disclosure may include a base plate 711, a magnet 712, a center pole 713, a bobbin 714, a coil 715, an edge plate 716, a damper 717, and a terminal portion 718.

The base plate 711 may be disposed at the first support 600 and may be a main body of the first sound generator 710. The base plate 711 may support the magnet 712, the center pole 713, and the edge plate 716. The base plate 711 may include a metal material having magnetism like iron (Fe). The base plate 711 may be a "lower plate," a "base frame," or a "yoke," but the term is not limited thereto.

The base plate 711 may include a groove portion that accommodates the magnet 712 and the bobbin 714. For example, the groove portion may be provided concavely from an upper surface of the base plate 711 to have a circular shape, but the shape is not limited thereto.

The base plate 711 according to an embodiment of the present disclosure may be on a bottom surface of the forming portion 630 of the first support 600 using a fixing member such as an adhesive or a double-sided tape.

According to another embodiment of the present disclosure, a portion of a rear surface of the base plate 711 may be inserted or accommodated into the first hole 641 in the forming portion 630 of the first support 600. In this case, the base plate 711 according to another embodiment of the present disclosure may include a rear protrusion portion 711*a* inserted into the first hole 641 provided in the forming portion 630 of the first support 600. The rear protrusion portion 711*a* may protrude from the base plate 711 to the first support 600 to include a groove portion that accommodates the magnet 712 and the bobbin 714, and may protrude to or may be exposed at the outside of a rear surface of the rear cover 600 through the first hole 641 in the forming portion 630 of the rear cover 600. Therefore, heat occurring due to driving (or vibrating) of the first sound generator 710 may be dissipated through the rear surface of the base plate 711 that protrudes to or is exposed at the outside of the rear surface of the rear cover 600 through the first hole 641, based on air cooling.

According to another embodiment of the present disclosure, the base plate 711 may be disposed at the forming portion 630 of the first support 600 using a plurality of second connection members 701 passing through the bottom surface of the forming portion 630 of the first support 600. The plurality of second connection members 701 may be respectively in a plurality of holes in a corner portion of the base plate 711 passing through the bottom surface of the forming portion 630, and thus, the first sound generator 710 may be disposed at the forming portion 630 of the first support 600.

The magnet 712, the center pole 713, the bobbin 714, and the coil 715 may each be a magnetic force circuit unit or a magnetic force vibration unit, which is on the base plate 711 to vibrate the display panel 200.

The magnetic force circuit unit according to an embodiment of the present disclosure may have an external magnetic type structure or dynamic type structure including the magnet 712 disposed outward from the coil 715, or may have an internal magnetic type structure or micro type structure including the magnet 712 disposed inward from the coil 715. The first sound generator 710 including the magnetic force circuit unit having the internal magnetic type structure may have a wholly small size and a low leakage magnetic flux. The first sound generator 710 according to an embodiment of the present disclosure may have an external magnetic type or internal magnetic type structure. Hereinafter, an example where the first sound generator 710 has the internal magnetic type structure will be described.

The magnet 712 according to an embodiment of the present disclosure may be inserted into the groove portion of the base plate 711. The magnet 712 may be a permanent magnet having a cylindrical shape capable of being inserted into the bobbin 714. According to an embodiment of the present disclosure, the magnet 712 may be implemented with a sintered magnet such as barium ferrite, and a material of the magnet 712 may include one or more of $Fe_2O_3$, $BaCO_3$, a neodymium magnet, strontium ferrite ($Fe_{12}O_{19}Sr$) with improved magnet component, an alloy cast magnet including Al, nickel (Ni), and cobalt (Co). For example, the neodymium magnet may be neodymium-iron-boron (Nd—Fe—B).

The bobbin 714 according to an embodiment of the present disclosure may be on the base plate 711 to surround the magnet 712. The bobbin 714 may have a circular shape or an oval shape, but is not limited thereto. The oval shape may have an elliptical shape, a rectangular shape with rounded corners, or non-circular curved shape having a width different from its height, but the embodiment is not limited thereto. For example, in the bobbin 714 having the oval shape, a ratio of a long-axis diameter to a short-axis diameter may be set to 1.3:1 to 2:1. The bobbin 714 having the oval shape may more improve a sound of a high sound band than a circular shape and may decrease the occurrence of heat caused by a vibration, and thus, may have an excellent heat dissipation characteristic.

The coil 715 according to an embodiment of the present disclosure may be wound to surround an outer circumference surface of the bobbin 714 and may be supplied with a current (or a voice current) of a driving signal from the outside. The coil 715 may be lowered or raised along with the bobbin 714. The coil 715 may be a voice coil, but the term is not limited thereto. When a current is applied to the coil 715, a whole portion of the bobbin 714 may vibrate upward and downward according to Fleming's Left Hand Rule for Motors based on an application magnetic field generated around the coil 715 and an external magnetic field generated around the magnet 712, and a sound DVS or a sound wave may be generated by a vibration of the display panel 200 caused by a vertical movement (or vibration) of the bobbin 714.

According to an embodiment of the present disclosure, as the coil 715 is wound to surround an outer circumference surface of the bobbin 714, heat occurring in the coil 715 may be transferred to the bobbin 714, and the coil 715 may include a material which is relatively good in heat dissipation characteristic, for decreasing an image quality defect affecting the display panel 200 due to the heat of the bobbin 714. Also, because the bobbin 714 vibrates upward and downward, a horizontal vibration may occur due to a vertical vibration, and a horizontal vibration of the bobbin 714 may be affected by a weight of the bobbin 714. A weight of the bobbin 714 may be affected by a weight of the coil 715, and thus, when a weight of the coil 715 is reduced, a horizontal vibration of the bobbin 714 may decrease. Therefore, considering heat transferred to the bobbin 714 and the horizontal vibration of the bobbin 714, the coil 715 may have a relatively good heat dissipation characteristic because thermal conductivity thereof is better than that of copper which is a material of a general coil, and may include an Al material which has a relatively good heat dissipation characteristic and is relatively lightweight compared to copper.

Moreover, in aluminum, because oxide is formed in air, welding may not be easy when manufacturing the first sound generator 710. Thus, the coil 715 according to an embodiment of the present disclosure may include an Al layer (or a first metal layer) for dissipating heat and a metal covering layer (or a second metal layer) surrounding the Al layer. The metal covering layer may include one of Cu, Ag, and gold (Au). For example, the coil 715 may be a copper clad aluminum wire by which copper is covered. The metal covering layer may be formed as a thin film type outside the first metal layer, and thus, may not greatly affect an increase in weight of the coil 715. A weight of the coil 715 according to an embodiment of the present disclosure may decrease by about 60% compared to a coil including only Cu or a Cu wire.

According to an embodiment of the present disclosure, the bobbin 714 may include a structure including a material obtained by processing pulp or paper, Al or Mg or an alloy thereof, or synthetic resin such as polyimide. For example, the bobbin 714 may be implemented with a polyimide film, which is relatively good in heat dissipation characteristic and is relatively lightweight, for preventing a local image quality defect of the display panel 200 caused by heat occurring in the coil 715.

The polyimide film may have physical properties which are not changed within a wide temperature range from −273° C. to 400° C. and may have a heat resistance, electrical insulation, flexibility, and discontinuity. Also, because the polyimide film is good in thermal and mechanical stiffness, the polyimide film may enhance the reliability of the bobbin 714, and the occurrence of heat caused by a vibration of the bobbin 714 may be reduced based on an excellent heat dissipation characteristic. For example, the polyimide film may be KAPTON and may be a condensation of pyromellitec dianhydride and 4,4'-oxydianiline, but is not limited thereto.

The center pole 713 may be accommodated or inserted into the bobbin 714 and may guide raising or lowering of the bobbin 714. For example, since the center pole 713 is inserted into the bobbin 714, an outer circumference surface of the center pole 713 may be surrounded by the bobbin 714. The center pole 713 may be an "elevation guider" or "pole pieces," but the term is not limited thereto.

The edge plate 716 may be disposed at a front periphery portion of the base plate 711 and may support the damper 717. The edge plate 716 according to an embodiment of the present disclosure may be provided at the front periphery portion of the base plate 711 to have a certain height and the same shape as that of the bobbin 714. According to another embodiment of the present disclosure, the edge plate 716 may include a hollow portion which is provided at the front periphery portion of the base plate 711 to have a certain height and the same shape as that of the bobbin 714.

The damper 717 may be between the edge plate 716 and the magnetic force circuit unit. For example, the damper 717 may be between the edge plate 716 and the bobbin 714. The damper 717 may be a "spider," a "suspension," or an "edge," but the term is not limited thereto.

One portion of the damper 717 according to an embodiment of the present disclosure may be connected to the edge plate 716, and the other portion of the damper 717 may be connected to an upper outer surface of the bobbin 714. The damper 717 may have a creased structure between the one portion and the other portion thereof and may be contracted and relaxed based on a vertical motion of the bobbin 714 to control a vibration of the bobbin 714. The damper 717 may be connected between the bobbin 714 and the edge plate 716 and may limit a vibration distance of the bobbin 714 with a restoring force. For example, when the bobbin 714 vibrates by a certain distance or more or vibrates by a certain distance or less, the bobbin 714 may be restored to an original position by the restoring force of the damper 717.

Because the first sound generator 710 is between the display panel 200 and the first support 600, the first sound generator 710 may have a relatively thin thickness so as to reduce a thickness of the display apparatus or slim the display apparatus. Due to this, when a height (or a thickness) of the bobbin 714 is reduced, a sound pressure level may be lowered. Therefore, to solve a problem where a sound pressure level is lowered due to a reduction in height of the bobbin 714, the first sound generator 710 may configure a structure where an area of the damper 717 disposed near the bobbin 714 is wide. In a case where an area of the damper 717 is enlarged, a space where a line for applying a current to the coil 715 is disposed may be narrowed, causing interference between the line and the damper 717. Therefore, the damper 717 may be formed of a conductor, and thus, may perform a function of the line.

The damper 717 according to an embodiment of the present disclosure may include a metal material electrically connected to the coil 715. For example, the damper 717 may be formed of stainless steel or Cu, but is not limited thereto.

The terminal portion 718 may include a pair of terminals that are on one portion of the base plate 711 and are electrically connected to the damper 717. The terminal portion 718 may overlap the first line hole 661 in the forming portion 630 of the first support 600 and may be exposed at the outside of the rear surface of the first support 600. The pair of terminals in the terminal portion 718 may be electrically connected to a driving signal cable passing through the first line hole 661 and may be supplied with a driving signal through the driving signal cable from the display host system.

The first sound generator 710 according to an embodiment of the present disclosure may further include a bobbin protection member 719.

The bobbin protection member 719 may be disposed on (connected to) a front surface (or a front end portion) of the bobbin 714 and may transfer a raising and lowering motion (or vibration) of the bobbin 714 to the rear surface of the display panel 200. The bobbin protection member 719 according to an embodiment of the present disclosure may have a ring shape on the front surface of the bobbin 714, a disc shape covering the whole front surface of the bobbin 714, or a gap shape surrounding the front surface and the upper outer surface of the bobbin 714, but the shape is not limited thereto. For example, the bobbin protection member 719 may be a "bobbin ring," but the term is not limited thereto.

The bobbin protection member 719 may be disposed on (or coupled to) the rear surface of the display panel 200 using a first adhesive member. The first adhesive member may be between the back plate 250 of the display panel 200 and the bobbin protection member 719. The adhesive member according to an embodiment of the present disclosure may include an adhesive or a double-sided tape, but is not limited thereto.

The second sound generator 730 of the vibration generating module 700 according to an embodiment of the present disclosure may be disposed at the first support 600 and may be symmetrical with the first sound generator 710 with respect to the center line (or the horizontal-length center line) CL of the display panel 200. The second sound generator 730 may include a structure which is substantially the same as that of the first sound generator 710, and thus, its repetitive description is omitted.

Figure 7:
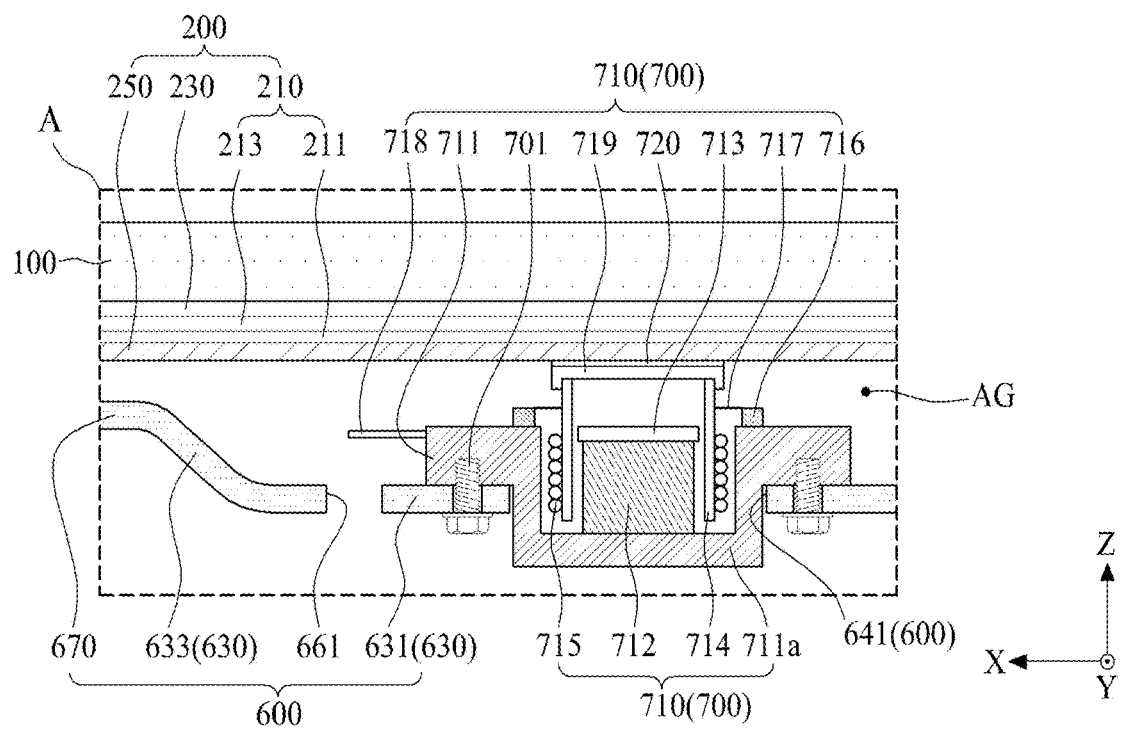
FIG. 7 is another enlarged view of a portion 'A' illustrated in FIG. 4.

FIG. 7 is another enlarged view of a portion 'A' illustrated in FIG. 4 and illustrates an example where a blocking member is disposed between a display panel and a vibration generating module. Hereinafter, descriptions of the same elements except a blocking member and relevant elements will be briefly given or are omitted.

With reference to FIG. 7, the display apparatus according to an embodiment of the present disclosure may further include a blocking member 720 disposed between the display panel 200 and the vibration generating module 700. The first sound generator 710 according to an embodiment of the present disclosure may further include the blocking member 720.

The blocking or shielding member 720 (or a heat blocking member or a heat insulation member) may block or minimize the transfer of heat, occurring in the first sound generator 710 due to driving (or vibration) of the first sound generator 710, to the display panel 200, and thus, may prevent or minimize the local temperature increase of the display panel 200 caused by the heat occurring in the first generator 710, thereby preventing the image quality defect of the display panel 200 caused by a rapid temperature difference in a local region of the display panel 200 overlapping the first sound generator 710. For example, heat occurring in the coil 715 and the like of the first sound generator 710 may not be transferred to the display panel 200 by the blocking member 720 and may be diffused and dissipated through the first support 600 and the heat dissipation member 130 via the base plate 711, or may be dissipated to the first support 600 through a rear surface (or a backside) of the base plate 711 based on air cooling. The blocking member 720 may be configured to have a size that is equal or similar to that of the first sound generator 710, but is not limited thereto. For example, the blocking member 720 may be configured to have a size that is equal or similar to that of the pixel array substrate 210.

For example, the blocking member 720 may have a film type or a plate type each including one of polyethylene, polyvinylpyrrolidone (PVP), polyethylene oxide (PEO), polyvinyl alcohol (PVA), polyvinyl acetate (PVAc), polylactic acid (PLA), polyamide (PA), polyester (PE), and polypropylene (PP), but is not limited thereto. As another example, the blocking member 720 may have a film type or a plate type each including one of rubber, silicon, fiber reinforced plastics, and composite resin including fiber reinforced plastics, but is not limited thereto. For example, the fiber reinforced plastics may include one of carbon fiber reinforced plastics, glass fiber reinforced plastics, and graphite fiber reinforced plastics or a combination thereof, but is not limited thereto.

The blocking member 720 according to an embodiment of the present disclosure may be between the rear surface of the display panel 200 and the bobbin 714 of the first sound generator 710, and in this case, the bobbin protection member 719 may be omitted. For example, the blocking member 720 may be on the bobbin 714 of the first sound generator 710 and may be disposed on or connected (or coupled) to the back plate 250 of the display panel 200 by an adhesive member.

According to another embodiment of the present disclosure, the blocking member 720 may be between the back plate 250 of the display panel 200 and the bobbin protection member 719 of the first sound generator 710. For example, the blocking member 720 may be disposed on (or connected to) a front surface of the bobbin protection member 719 and may be disposed on or connected (or coupled) to the back plate 250 of the display panel 200 by an adhesive member.

The blocking member 720 may be between the display panel 200 and the second sound generator 730 of the vibration generating module 700. For example, the blocking member 720 may be between the rear surface of the display panel 200 and the bobbin 714 of the second sound generator 730, and in this case, the bobbin protection member 719 of the second sound generator 730 may be omitted. As another example, the blocking member 720 may be between the back plate 250 of the display panel 200 and the bobbin protection member 719 of the second sound generator 730.

The display apparatus according to an embodiment of the present disclosure may include the blocking member 720 between the display panel 200 and the vibration generating module 700, and thus, may prevent or minimize the local temperature increase of the display panel 200 caused by heat occurring in the vibration generating module 700, thereby preventing the image quality defect of the display panel 200 caused by a rapid temperature difference in a local region of the display panel 200 overlapping the vibration generating module 700.

Figure 8:
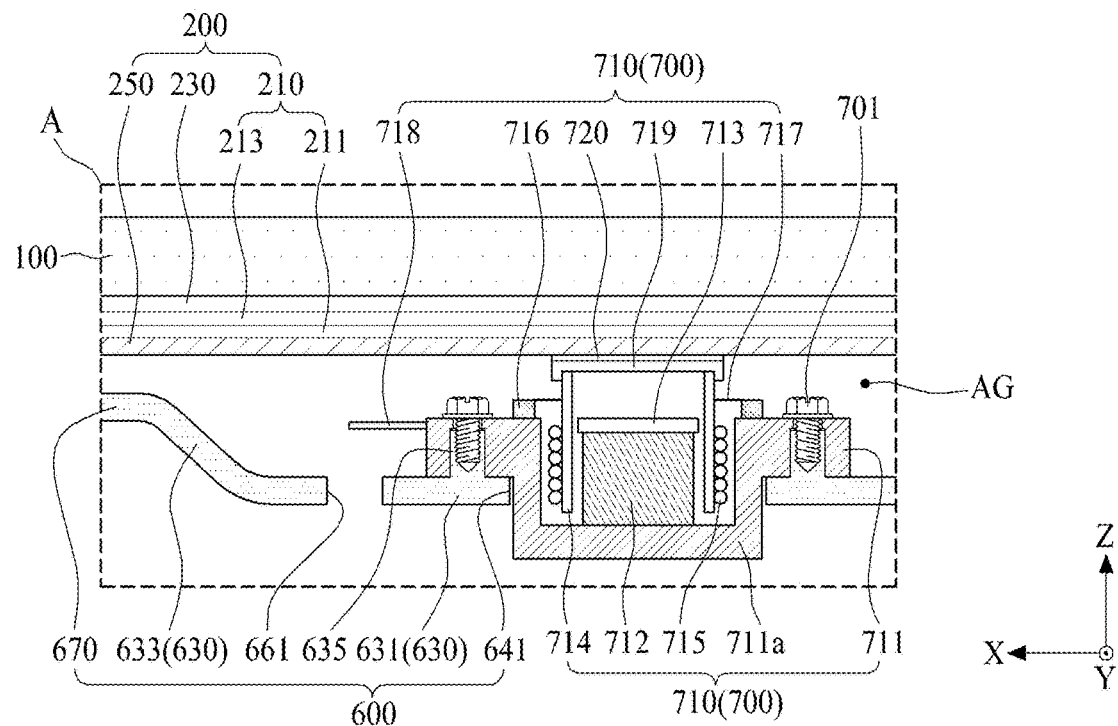
FIG. 8 is another enlarged view of a portion 'A' illustrated in FIG. 4.

FIG. 8 is another enlarged view of a portion 'A' illustrated in FIG. 4 and illustrates an example where a disposition or connection (or coupling) structure between a vibration generating module and a first support is modified. Hereinafter, descriptions of the same elements except a disposition or connection (or coupling) structure between a vibration generating module and a first support will be briefly given or are omitted.

With reference to FIG. 8, a first sound generator 710 of a vibration generating module 700 according to an embodiment of the present disclosure may be disposed at, supported by, or connected (or coupled) to a forming portion 630 of a first support 600 using a plurality of second connection members 701.

Each of the plurality of second connection members 701 may be connected to or disposed on an inner surface of the first support 600 through the vibration generating module 700, and thus, the vibration generating module 700 may be supported by or connected (or coupled) to the first support 600. For example, each of the plurality of second connection members 701 may be disposed on or connected to the bottom surface of the forming portion 630 through a periphery portion of a base plate 711 of the first sound generator 710 using an inner connection manner. Thus, the first sound generator 710 may be supported by or connected (or coupled) to the bottom surface of the forming portion 630.

The first support 600 may further include a plurality of boss portions 635 on the bottom surface of the forming portion 630. Each of the plurality of boss portions 635 may include a hole that protrudes from the bottom surface of the forming portion 630 overlapping the periphery portion of the base plate 711 and is connected to a corresponding second connection member 701 of the plurality of second connection members 701. For example, each of the plurality of boss portions 635 may be inserted or accommodated into a corresponding boss groove of the plurality of boss grooves provided at the periphery portion of the base plate 711 of the first sound generator 710.

The second sound generator 730 of the vibration generating module 700 according to an embodiment of the present disclosure, like the first sound generator 710, may be disposed on, supported by, or connected (or coupled) to a bottom surface of a forming portion using an inner connection manner using a connection member.

A vibration generating module 700 according to an embodiment of the present disclosure may be connected (or coupled) to the first support 600 according to an inner connection manner using the plurality of second connection members 701 to increase a supporting force or a coupling force between the vibration generating module 700 and the first support 600, and when the vibration generating module 700 is being driven (or is vibrating), a noise caused by an undesired vibration between the vibration generating module 700 and the first support 600 may be prevented. Moreover, because each of the plurality of second connection members 701 for supporting or coupling the vibration generating module 700 to the first support 600 is not exposed at a rear surface (or a backside) of the first support 600, the display apparatus according to an embodiment of the present disclosure may have a rear clean back structure, thereby enhancing a sense of beauty in design. Also, in the display apparatus according to an embodiment of the present disclosure, a thickness of the vibration generating module 700 may be reduced, and thus, the vibration generating module 700 may be provided between the display panel 200 and the first support 600, thereby decreasing a thickness of the display apparatus. Also, because the vibration generating module 700 according to an embodiment of the present disclosure is provided between the display panel 200 and the first support 600, the rear surface of the first support 600 may not need a hole where the vibration generating module 700 is disposed, thereby enhancing a degree of freedom based on a size or model of the display apparatus.

Figure 9:
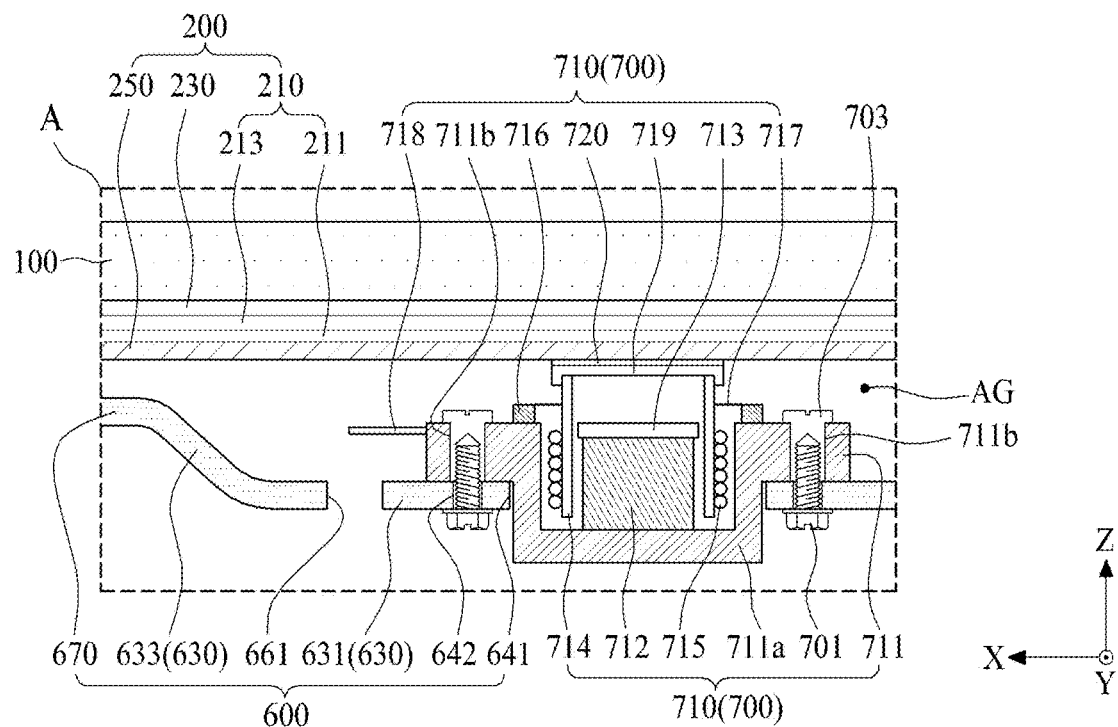
FIG. 9 is another enlarged view of a portion 'A' illustrated in FIG. 4.

FIG. 9 is another enlarged view of a portion 'A' illustrated in FIG. 4 and illustrates an example where a disposition or a connection (or coupling) structure between a vibration generating module and a first support is modified. Hereinafter, descriptions of the same elements except a disposition or connection (or coupling) structure between a vibration generating module and a first support will be briefly given or are omitted.

With reference to FIG. 9, a first sound generator 710 of a vibration generating module 700 according to an embodiment of the present disclosure may be disposed at, supported by, or coupled to a forming portion 630 of a first support 600 using a bidirectional connection manner.

The display apparatus according to an embodiment of the present disclosure may further include a plurality of coupling members 703 fastened (connected) to each of a plurality of second connection members 701.

Each of the plurality of coupling members 703 may pass through a periphery portion of a base plate 711 of a first sound generator 710, and may be disposed at or connected (or coupled) to a corresponding second connection member 701 of the plurality of second connection members 701. For example, each of the plurality of coupling members 703 may be inserted or accommodated into a corresponding second hole 711*b* of a plurality of second holes 711*b* provided in an periphery portion of a base plate 711 of a first sound generator 710. Each of the plurality of coupling members 703 according to an embodiment may be a nut or self-clinching (e.g., PEM®) nut each including a head portion which is greater than a diameter of the second hole 711*b*, but is not limited thereto.

Each of the plurality of second connection members 701 may pass through a bottom surface of a forming portion 630 of a first support 600 and may be connected or coupled to a corresponding coupling member 703 of the plurality of coupling members 703. Thus, the first sound generator 710 may be supported by or coupled to a bottom surface of the forming portion 630. Therefore, the first sound generator 710 may be disposed on, supported by, or connected (or coupled) to the bottom surface of the forming portion 630 by a bidirectional connection manner using the second connection members 701 and the coupling members 703.

The first support 600 may further include a hole 642 provided in the bottom surface of the forming portion 630. The hole 642 may include a screw thread connected or fastened to the second connection member 701 or may have a hole type, but is not limited thereto.

A second sound generator 730 of the vibration generating module 700 according to an embodiment of the present disclosure, like the first sound generator 710, may be disposed on, supported by, or connected (or coupled) to a bottom surface of a forming portion according to a bidirectional connection manner using the plurality of second connection members 701 and the plurality of coupling members 703.

In the display apparatus according to an embodiment of the present disclosure, since the vibration generating module 700 and the first support 600 are connected or coupled to each other according to the bidirectional connection manner using the second connection members 701 and the coupling members 703, a supporting force or a coupling force between the vibration generating module 700 and the first support 600 may increase, and when the vibration generating module 700 is being driven (or is vibrating), a noise caused by an undesired vibration between the vibration generating module 700 and the first support 600 may be prevented.

Figure 10:
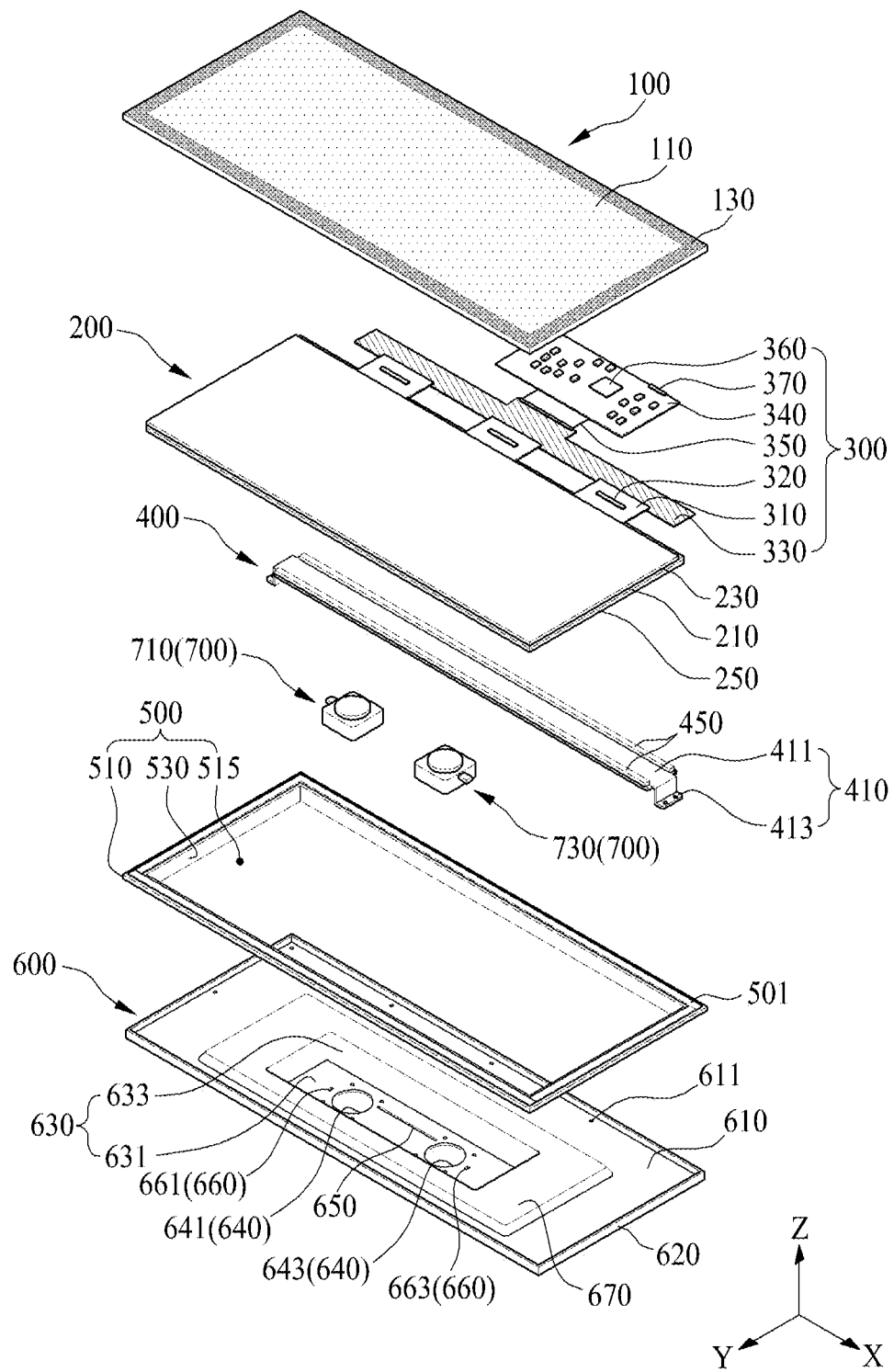
FIG. 10 is an exploded view illustrating a display apparatus according to another embodiment of the present disclosure.
Figure 11:
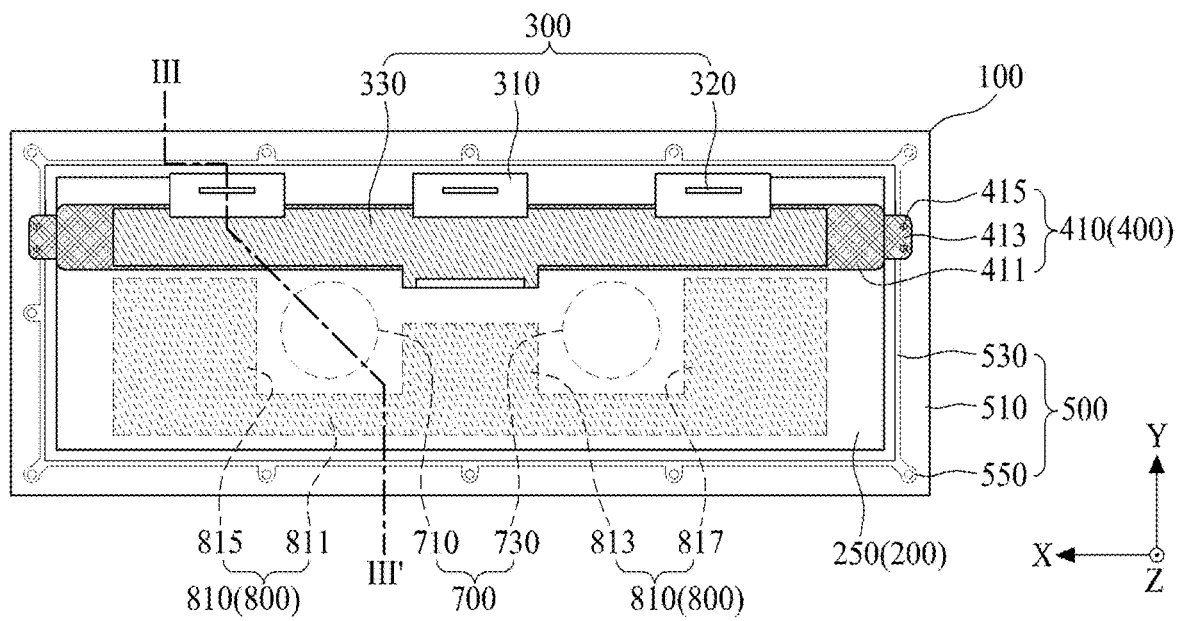
FIG. 11 illustrates a supporting frame and a holder each disposed in a rear surface of a display panel illustrated in FIG. 10.
Figure 12:
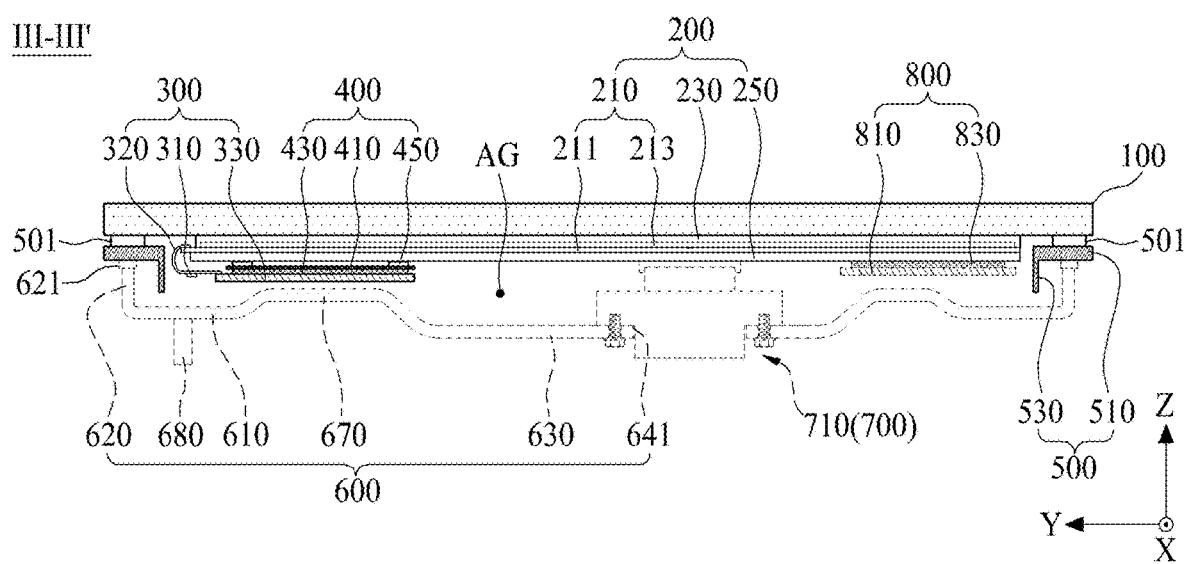
FIG. 12 is a cross-sectional view taken along line illustrated in FIG. 11.

FIG. 10 is an exploded view illustrating a display apparatus according to another embodiment of the present disclosure. FIG. 11 illustrates a supporting frame and a holder each disposed in a rear surface of a display panel illustrated in FIG. 10. FIG. 12 is a cross-sectional view taken along line illustrated in FIG. 11. FIGS. 10 to 12 illustrate an example where the second support of the display apparatus illustrated in FIGS. 1 to 9 is modified. Hereinafter, descriptions of the same elements except a second support and relevant elements will be briefly given or are omitted.

With reference to FIGS. 10 to 12, in the display apparatus according to another embodiment of the present disclosure, a second supporting member 400 may include a holder 410 that is disposed at a supporting frame 500 to support a PCB 330 of a driving circuit 300.

The holder 410 may separate the PCB 330 from a rear surface of a display panel 200 to prevent a vibration of the display panel 200 from being transferred to the PCB 330. The PCB 330 may be disposed (or connected) at the holder 410. The first support 600 may protect the PCB 330.

The holder 410 according to an embodiment of the present disclosure may include a second plate 411 and a pair of bridges 413.

The second plate 411 (or a holder plate) may be between the rear surface of the display panel 200 and the PCB 330. The second plate 411 may be spaced apart from the rear surface of the display panel 200 by a certain distance. For example, the second plate 411 may have a size that is wider than the PCB 330.

The second plate 411 according to an embodiment of the present disclosure may be disposed on a rear surface of the PCB 330 by a second adhesive member 430.

The second adhesive member 430 may be disposed (or connected) between the PCB 330 and a rear surface of the second plate 411 facing the first support 600. The second adhesive member 430 according to an embodiment of the present disclosure may include a vibration absorbing material, which blocks or minimizes the transfer of a vibration of the display panel 200 to the PCB 330, or an elastic material capable of being compressed to a certain degree. For example, the second adhesive member 430 may include a double-sided tape or a double-sided foam tape each including a vibration absorbing layer (or an elastic layer), but is not limited thereto.

The pair of bridges 413 may be bent from both sides of the second plate 411 and may be connected to the supporting frame 500, thereby supporting the second plate 411. For example, the pair of bridges 413 may be bent from both ends or both sides of the second plate 411 and may be connected to the supporting frame 500, thereby supporting the second plate 411. The pair of bridges 413 may be disposed at a frame side portion 530 of the supporting frame 500 using a plurality of third connection members 415. Each of the third connection members 415 may be a screw or a bolt, but is not limited thereto. Therefore, the second plate 411 may be supported by the pair of bridges 413 connected to or disposed at the supporting frame 500, and thus, may be spaced apart from the rear surface of the display panel 200 by a certain distance.

The second support 400 according to an embodiment of the present disclosure may further include a buffering member 450.

The buffering member 450 may be disposed (or connected) between the second plate 411 and the rear surface of the display panel 200. When the display panel 200 is vibrating, the buffering member 450 may prevent a physical contact between the rear surface of the display panel 200 and the PCB 330 and may block or minimize the transfer of the vibration of the display panel 200 to the PCB 330.

The buffering member 450 according to an embodiment of the present disclosure may be between the rear surface of the display panel 200 and the first support 600. For example, the buffering member 450 may be disposed in parallel with both periphery portions of the second plate 411 parallel to a lengthwise direction X of the second plate 411. The buffering member 450 according to an embodiment of the present disclosure may include a vibration absorbing material, which blocks or minimizes the transfer of a vibration of the display panel 200 to the PCB 330, or an elastic material capable of being compressed to a certain degree. For example, the buffering member 450 may include a double-sided tape or a double-sided foam tape each including a vibration absorbing layer (or an elastic layer), but is not limited thereto.

Figure 13:
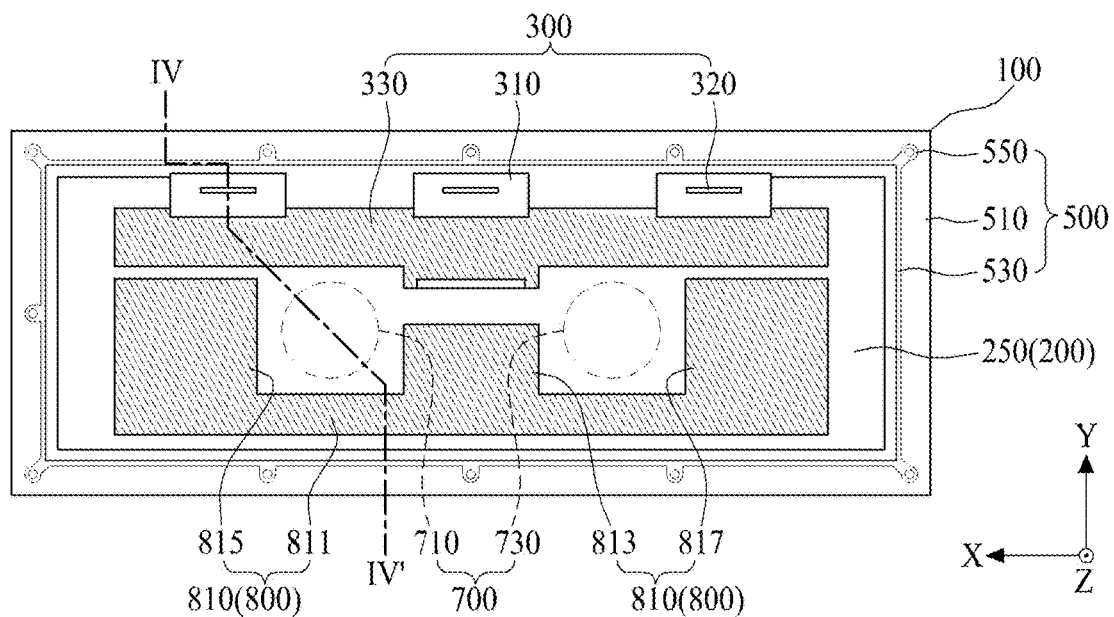
FIG. 13 illustrates a display apparatus according to another embodiment of the present disclosure.
Figure 14:
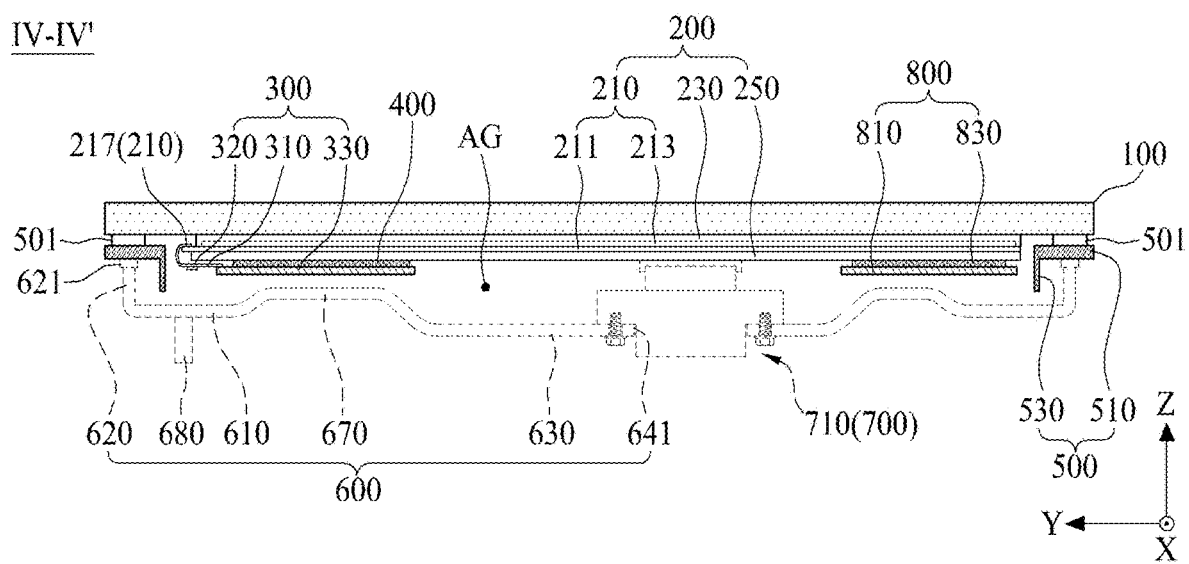
FIG. 14 is a cross-sectional view taken along line IV-IV' illustrated in FIG. 13.

FIG. 13 illustrates a display apparatus according to another embodiment of the present disclosure. FIG. 14 is a cross-sectional view taken along line IV-IV' illustrated in FIG. 13. FIGS. 13 and 14 illustrate an example where a balance member is added to the display apparatus illustrated in FIGS. 1 to 12. FIG. 13 illustrates a rear surface of a display panel from which a first support and a vibration generating module are removed from the display apparatus illustrated in FIG. 2. Hereinafter, descriptions of the same elements except a balance member and relevant elements will be briefly given or are omitted.

With reference to FIGS. 13 and 14, in a display apparatus according to another embodiment of the present disclosure, a balance member 800 may be disposed on (or connected to) a rear surface of a display panel 200. For example, the balance member 800 may be in a first region overlapping a PCB 330 of a driving circuit 300 and a third region other than a second region overlapping a vibration generating module 700 in a rear region of the display panel 200. The balance member 800 may make uniform a vibration balance between the first region and the third region of the display panel 200 generated by a vibration of the vibration generating module 700. For example, the balance member 800 may prevent or minimize a vibration deviation in the first region, where the PCB 330 is disposed, and the third region, where the PCB 330 is not disposed, of the rear surface of the display panel 200.

For example, the PCB 330 (or a first PCB or a main PCB) may have mass, and thus, may act as a mass on the first region of the display panel 200. Therefore, when the display panel 200 is vibrating, a vibration deviation or a maximum vibration displacement deviation may occur in the first region where the PCB 330 is disposed and the third region where the PCB 330 is not disposed. Therefore, the balance member 800 may act as a mass on the third region where the PCB 330 is not disposed, and thus, may adjust a vibration balance between the first region where the PCB 330 is disposed and the third region where the PCB 330 is not disposed, thereby increasing the vibration efficiency of the vibration generating module 700.

The balance member 800 according to an embodiment of the present disclosure may include a second PCB 810 and a third adhesive member 830.

The second PCB 810 may be on the rear surface of the display panel 200. For example, the second PCB 810 may be in the first region overlapping the PCB 330 of the driving circuit 300 and the third region other than the second region overlapping the vibration generating module 700 in the rear region of the display panel 200. The second PCB 810 according to an embodiment of the present disclosure may include the same material as that of the PCB 330 and may have a size that is greater than that of the PCB 330. For example, the second PCB 810 may be another PCB, a dummy PCB, or an auxiliary PCB, but the term is not limited thereto.

The second PCB 810 according to an embodiment of the present disclosure may include a main board portion 811, which is disposed at a second rear periphery portion parallel to a first rear periphery portion of the display panel 200, a first board extension portion 813, which extends from a center portion of the main board portion 811 to the first rear periphery portion of the display panel 200, a second board extension portion 815, which extends from one periphery portion of the main board portion 811 to the first rear periphery portion of the display panel 200, and a third board extension portion 817, which extends from the other periphery portion of the main board portion 811 to the first rear periphery portion of the display panel 200. For example, the second PCB 810 may have a "⌐_⊥_⌐"-shape which faces from the second rear periphery portion to the first rear periphery portion of the display panel 200.

The first board extension portion 813 and the second board extension portion 815 may be parallel to each other with a disposition region of the first sound generator 710 of the vibration generating module 700 therebetween, and the first board extension portion 813 therebetween and the third board extension portion 817 may be parallel to each other with a disposition region of the second sound generator 730 of the vibration generating module 700 therebetween.

The third adhesive member 830 may be disposed (or connected) between the rear surface of the display panel 200 and the second PCB 810. For example, the second PCB 810 may be disposed at (or coupled to) the rear surface of the display panel 200 using the third adhesive member 830.

The third adhesive member 830 according to an embodiment of the present disclosure may include a vibration absorbing material or an elastic material capable of being compressed to a certain degree, for preventing or minimizing a noise occurring due to a vibration of the second PCB 810 caused by a vibration of the display panel 200. For example, the third adhesive member 830 may include a material for blocking or minimizing the transfer of a vibration of the display panel 200 to the PCB 330. For example, the third adhesive member 830 may include a double-sided tape or a double-sided foam tape each including a vibration absorbing layer (or an elastic layer), but is not limited thereto.

Therefore, the display apparatus according to another embodiment of the present disclosure may have the same effect as that of the display apparatus illustrated in FIGS. 1 to 12, and may realize the vibration balancing of the display panel 200 using the balance member 800, thereby increasing the vibration efficiency of the vibration generating module 700 and increasing the reproduction band and sound pressure level of a sound generated by a vibration of the display panel 200.

As another example, as illustrated in FIGS. 11 and 12, the balance member 800 according to an embodiment of the present disclosure may be applied to the display apparatus according to another embodiment of the present disclosure.

Figure 15:
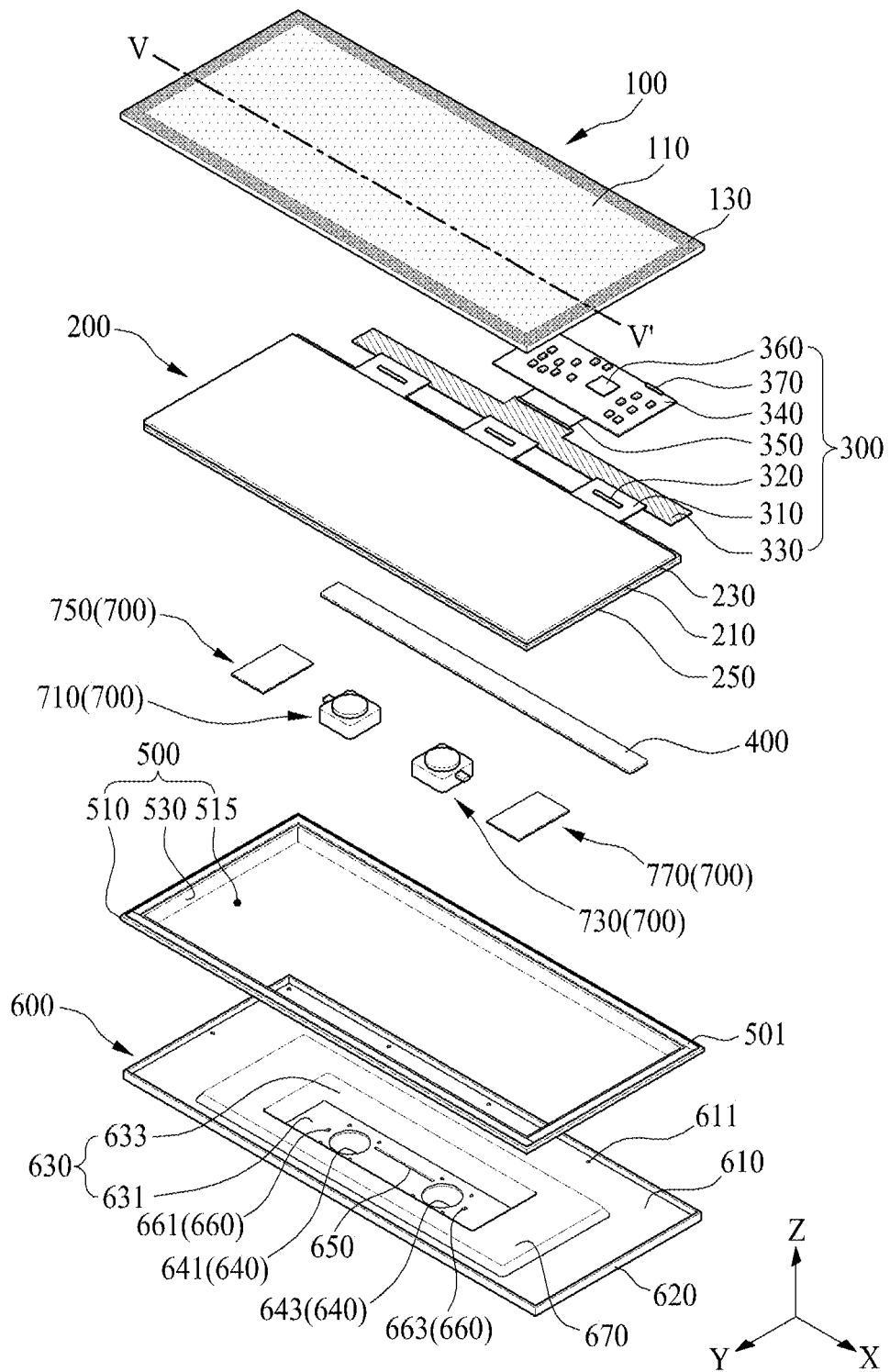
FIG. 15 illustrates a display apparatus according to another embodiment of the present disclosure.
Figure 16:
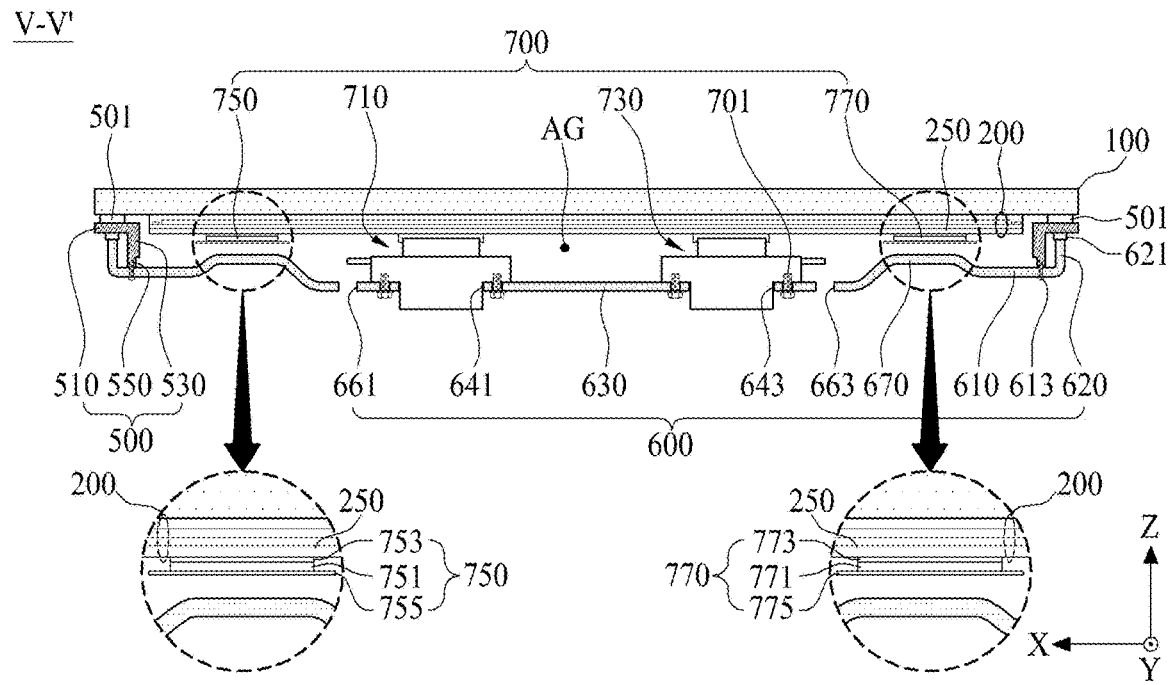
FIG. 16 is a cross-sectional view taken along line V-V' illustrated in FIG. 15.

FIG. 15 illustrates a display apparatus according to another embodiment of the present disclosure. FIG. 16 is a cross-sectional view taken along line V-V' illustrated in FIG. 15. FIGS. 15 and 16 illustrate an example where a configuration of the vibration generating module provided in the display apparatus illustrated in FIGS. 1 to 14 is modified. Hereinafter, descriptions of the same elements except a vibration generating module and relevant elements will be briefly given or are omitted.

With reference to FIGS. 15 and 16, in the display apparatus according to another embodiment of the present disclosure, a vibration generating module 700 may include a first sound generator 710, a second sound generator 730, a third sound generator 750, and a fourth sound generator 770.

The first sound generator 710 and the second sound generator 730 may be substantially the same as the first sound generator 710 and the second sound generator 730 of the above-described display apparatus. Hereinafter, therefore, like reference numerals refer to like elements, and their repetitive descriptions are omitted or will be briefly given.

Each of the first sound generator 710 and the second sound generator 730 according to an embodiment of the present disclosure may vibrate the display panel 200 to output sound of a first sound band. The sound of the first sound band according to an embodiment may be output from a center portion of the display panel 200 to a forward region with respect to the display panel 200. The sound of the first sound band may have a frequency of a low-pitched sound band. For example, the low-pitched sound band may be less than 200 Hz, but is not limited thereto and may be less than 3 kHz.

The third sound generator 750 may vibrate a third rear surface of the display panel 200 to output sound of a second sound band, which is higher than the sound of the first sound band. The fourth sound generator 770 may vibrate a fourth rear surface of the display panel 200 to output sound of the second sound band. For example, the third rear surface of the display panel 200 may include a third rear periphery portion, a left periphery portion, or one periphery portion. The fourth rear surface of the display panel 200 may include a fourth rear periphery portion, a right periphery portion, or the other periphery portion.

A sound of the second sound band according to an embodiment of the present disclosure may be output from a periphery portion of the display panel 200 to the forward region. The sound of the second sound band may have a frequency of a middle-high-pitched sound band or a high-pitched sound band. For example, a middle-pitched sound band may be 200 Hz to 3 kHz, but is not limited thereto, and may be 3 kHz to 5 kHz. The high-pitched sound band may be 3 kHz or more, but is not limited thereto, and may be 5 kHz or more.

The third sound generator 750 may output a first sound (or a left sound) along with the first sound generator 710, and the fourth sound generator 770 may output a second sound (or a right sound) along with the second sound generator 730. The third and fourth sound generators 750 and 770 may complement or enhance a sound (for example, a sound of the high-pitched sound band) of each of the first and second sound generators 710 and 730. Also, each of the first sound generator 710, the second sound generator 730, the third sound generator 750, and the fourth sound generator 770 may output a multichannel stereo sound or a stereo sound.

The third sound generator 750 according to an embodiment of the present disclosure may include a first piezoelectric device 751 disposed at the third rear periphery portion of the display panel 200.

The first piezoelectric device 751 may include a piezoelectric material layer having a piezoelectric effect.

The piezoelectric material layer may include a piezoelectric material that vibrates with an electric field. Here, the piezoelectric material may have a characteristic in which as pressure is applied to or twisting occurs in a crystalline structure due to an external force, a potential difference is caused by dielectric polarization based on a relative position change of a positive (+) ion and a negative (−) ion, and vibration occurs due to an electric field based on an applied voltage.

The piezoelectric material layer according to an embodiment of the present disclosure may include a polymer material-containing piezoelectric material, a thin film material-containing piezoelectric material, a composite material-containing piezoelectric material, or a single crystalline ceramic or polycrystalline ceramic-containing piezoelectric material. Examples of the polymer material-containing piezoelectric material may include poly vinylidene fluoride (PVDF), polyvinylidene fluoride trifluoroethylene P(VDF-TrFe), and P(VDFTeFE). Examples of the thin film material-containing piezoelectric material may include ZnO, CdS, and AlN. Examples of the composite material-containing piezoelectric material may include PZT-PVDF, PZT-silicon rubber, PZT-epoxy, PZT-foam polymer, and PZT-foam urethane. Examples of the single crystalline ceramic-containing piezoelectric material may include $\alpha$-AlPO$_4$, $\alpha$-SiO$_2$, LiNbO$_3$, Tb$_2$(MoO$_4$)$_3$, Li$_2$B$_4$O$_7$, and ZnO. Examples of the polycrystalline ceramic-containing piezoelectric material may include a PZT-based material, a PT-based material, a PZT-complex Perovskite-based material, and BaTiO$_3$.

As another example, the first piezoelectric device 751 may include a plurality of first portions and a plurality of second portions each disposed between two adjacent first portions of the plurality of first portions. Each of the plurality of first portions may be formed of a ceramic-based material for generating a relatively high vibration, or may be formed of piezoelectric ceramic having a perovskite-based crystalline structure. The perovskite crystalline structure may have a piezoelectric effect and an inverse piezoelectric effect and may be a plate-shaped structure having orientation. As another example, the inorganic material portion provided in each of the plurality of first portions may include one or more materials of lead (Pb), zirconium (Zr), titanium (Ti), zinc (Zn), nickel (Ni), and niobium (Nb), but is not limited thereto. As another example, the inorganic material portion provided in each of the plurality of first portions may include a lead zirconate titanate (PZT)-based material including lead (Pb), zirconium (Zr), and titanium (Ti) or may include a lead zirconate nickel niobate (PZNN)-based material including lead (Pb), zinc (Zn), nickel (Ni), and niobium (Nb), but is not limited thereto. Also, the inorganic material portion may include at least one of $CaTiO_3$, $BaTiO_3$, and $SrTiO_3$ each including no Pb, but is not limited thereto.

The organic material portion provided in each of the plurality of second portions may include an organic material or an organic polymer, each of which has a flexible characteristic in comparison with the inorganic material portion, which is each of the first portions. For example, each of the plurality of second portions may include an organic material, an organic polymer, an organic piezoelectric material, or an organic non-piezoelectric material. For example, each of the plurality of second portions may be an adhesive portion, an elastic portion, a bending portion, a damping portion, or a flexible portion, but is not limited thereto.

An organic material portion according to an embodiment of the present disclosure may include at least one of an organic piezoelectric material and an organic non-piezoelectric material. An organic material portion including an organic piezoelectric material may absorb an impact applied to an inorganic material portion (or a first portion), and thus, may enhance the total durability of the first piezoelectric device 751 and may provide a piezoelectric characteristic corresponding to a certain level or more. The organic piezoelectric material according to an embodiment may be an organic material having an electro active material. For example, the organic piezoelectric material may include at least one of polyvinylidene fluoride (PVDF), β-Polyvinylidene fluoride (β-PVDF), and polyvinylidene-trifluoroethylene (PVDF-TrFE), but is not limited thereto. An organic material portion including an organic non-piezoelectric material may include a curable resin composition and an adhesive including the curable resin composition, and thus, may absorb an impact applied to an inorganic material portion (or a first portion), thereby enhancing the total durability of the first piezoelectric device 751. The organic non-piezoelectric material according to an embodiment of the present disclosure may include at least one of an epoxy-based polymer, an acryl-based polymer, and a silicon-based polymer, but is not limited thereto. Therefore, a sound generator may be configured with a plurality of first portions and a plurality of second portions each disposed between two adjacent first portions of the plurality of first portions, thereby providing a vibration generating module for enhancing a piezoelectric characteristic, stiffness, and flexibility. Accordingly, a vibration generating module with the enhanced piezoelectric characteristic, stiffness, and flexibility of a sound generator may be configured, and thus, may be applied to a flexible display apparatus (for example, an automotive display apparatus). For example, the flexible display apparatus may be a foldable display apparatus, a bendable display apparatus, a wearable display apparatus, and a rollable display apparatus, but is not limited thereto.

An electrode may be on each of an upper surface and a lower surface of the first piezoelectric device 751 according to an embodiment of the present disclosure. The electrode may include one or more of carbon (C), palladium (Pd), iron (Fe), tin (Sn), aluminum (Al), nickel (Ni), platinum (Pt), gold (Au), silver (Ag), copper (Cu), titanium (Ti), and molybdenum (Mo), or an alloy thereof, but is not limited thereto. For example, the electrode may include indium tin oxide (ITO), indium zinc oxide (IZO), or a Mo—Ti alloy, but is not limited thereto.

The first piezoelectric device 751 according to an embodiment of the present disclosure may be disposed on (or connected to) the third rear periphery portion of the display panel 200 by a third connection member 753 (or a third coupling member). The third connection member 753 may be a double-sided tape or a naturally curable adhesive, but is not limited thereto.

The third sound generator 750 according to an embodiment of the present disclosure may further include a first protection member 755 disposed on a rear surface of the first piezoelectric device 751. For example, the first protection member 755 may be on a rear surface of an electrode on the rear surface of the first piezoelectric device 751. As another example, the first protection member 755 may be on each of the upper surface and the lower surface (or the rear surface) of the first piezoelectric device 751.

The first protection member 755 may have a size that is wider than the first piezoelectric device 751 and may be on the rear surface of the first piezoelectric device 751. The first protection member 755 may prevent the first piezoelectric device 751 from being damaged by an electrical impact such as static electricity and/or a physical impact. The first protection member 755 according to an embodiment of the present disclosure may include a cross-sectional insulation tape or an insulation cross-sectional foam tape each having an adhesive layer on the rear surface of the first piezoelectric device 751. For example, the first protection member may be a polyimide (PI) film, a polyethylene terephthalate (PET) insulation tape, or a polyvinyl chloride (PVC) insulation tape, but is not limited thereto.

The fourth sound generator 770 may include a second piezoelectric device 771 which is disposed on (or connected to) a fourth rear periphery portion of the display panel 200 by a fourth connection member 773. Also, the fourth sound generator 770 may further include a second protection member 775 disposed on (or connected to) a rear surface of the second piezoelectric device 771. Except for that the second piezoelectric device 771 is disposed on (or connected to) the fourth rear periphery portion of the display panel 200 by the fourth connection member 773, the fourth sound generator 770 having such a configuration may be substantially the same as the third sound generator 750, and thus, its repetitive description is omitted.

Therefore, the display apparatus according to another embodiment of the present disclosure may have the same effect as that of the display apparatus illustrated in FIGS. 1 to 9. Also, the display apparatus according to an embodiment of the present disclosure may output a sound of the first sound band based on a vibration of the display panel 200 responding to a vibration of each of the first and second sound generators 710 and 730 based on a coil type having a relatively good low sound output characteristic. Furthermore, the display apparatus may output sound of the second sound band based on a vibration of the display panel 200 responding to a vibration of each of the third and fourth sound generators 750 and 770 based on a piezoelectric type having a relatively good high sound output characteristic, to a forward region in front of the display panel 200, thereby outputting a sound having a broad sound band and outputting a stereo sound, or outputting a multichannel stereo sound.

As another example, the third sound generator 750 and the fourth sound generator 770 according to an embodiment of the present disclosure may be identically applied to the display apparatus illustrated in FIGS. 10 to 12. Also, the third sound generator 750 and the fourth sound generator 770 according to an embodiment of the present disclosure may be identically applied to the display apparatus illustrated in FIGS. 13 and 14, and the balance member may be disposed in a region of the rear region of the display panel 200 other than where the third sound generator 750 and the fourth sound generator 770 are disposed.

Figure 17:
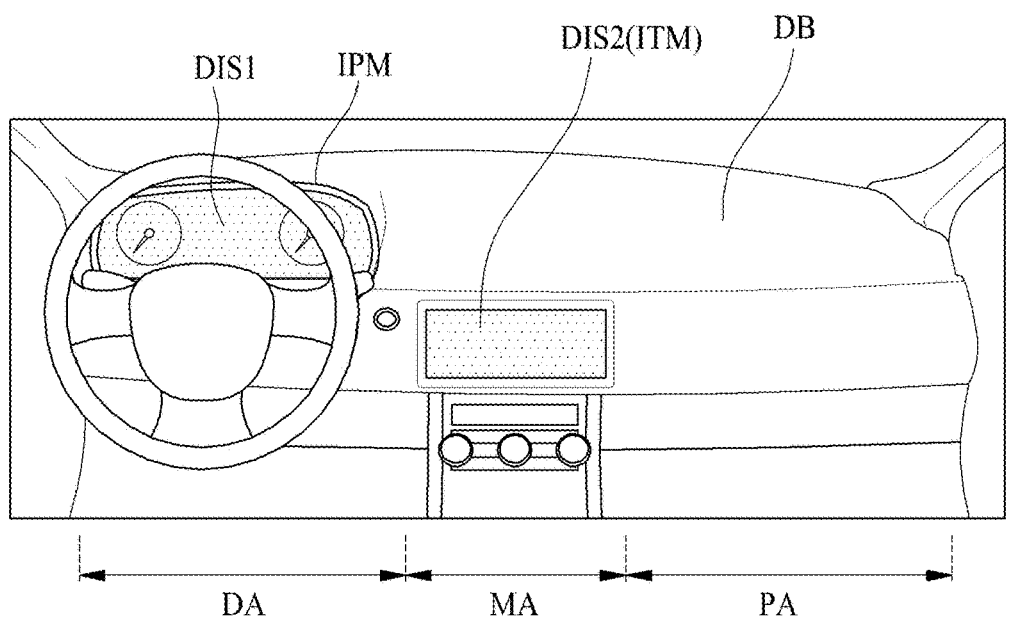
FIG. 17 illustrates a vehicle according to an embodiment of the present disclosure.

FIG. 17 illustrates a vehicle according to an embodiment of the present disclosure and illustrates an example where the display apparatus according to an embodiment of the present disclosure illustrated in FIGS. 1 to 16 is applied to a vehicle.

With reference to FIG. 17, the vehicle according to an embodiment of the present disclosure may include a dashboard DB, an instrument panel module IPM, and an infotainment module ITM.

The dashboard DB may include a first region DA facing a driver seat, a second region PA facing a passenger seat, and a third region MA between the first region DA and the second region PA.

The instrument panel module IPM may include a first display DIS1, which is disposed in the first region DA of the dashboard DB. The instrument panel module IPM may be a dashboard module or an instrument cluster, but the term is not limited thereto.

The first display DIS1 may provide a driver with various information such as vehicle state information and driving-related information such as the driving time, velocity, fuel amount, and revolutions per minute (RPM) of the vehicle.

The first display DIS1 may include the display apparatus illustrated in FIGS. 1 to 16, and thus, its repetitive description is omitted. Therefore, the first display DIS1 may display an image, corresponding to vehicle driving information provided from a vehicle host system, on a display panel. Also, the first display DIS1 may output, to the driver seat, a sound generated by a vibration of the display panel responding to a vibration of a vibration generating module based on a sound driving signal provided from the vehicle host system.

The infotainment module ITM (or an infotainment system) may include a second display DIS2 which is disposed in the third region MA (or a center fascia) of the dashboard DB.

The second display DIS2 may be connected to a navigation system and a vehicle convenience system such as an audio system, an air conditioning system, and a multimedia system each equipped in the vehicle and may display navigation information provided from the navigation system and a control icon for controlling a corresponding vehicle convenience system. Also, the second display DIS2 may provide a driver or a passenger with a sound corresponding to a sound signal provided from the audio system and/or the multimedia system.

The second display DIS2 may include the display apparatus illustrated in FIGS. 1 to 16, and thus, its repetitive description is omitted. Therefore, a display panel of the second display DIS2 may display navigation information provided from the navigation system and a control icon for controlling a corresponding vehicle convenience system. Also, the second display DIS2 may directly output a sound generated from the display panel, which vibrates by a vibration of the vibration generating module based on a sound signal provided from the audio system and/or the multimedia system. Also, the second display DIS2 may sense a user touch through a touch electrode layer disposed in the display panel to perform an interface with a user.

The second display DIS2 may have a length that is enlarged toward the second region PA of the dashboard DB. For example, the second display DIS2 may be disposed in the third region MA and the second region PA of the dashboard DB.

Therefore, the vehicle according to an embodiment of the present disclosure may include the instrument panel module IPM including the first display DIS1 to which the display apparatus according to an embodiment of the present disclosure illustrated in FIGS. 1 to 16 is applied, and thus, may output a sound, generated by a vibration of the first display DIS1, to a face of a driver to directly transfer the sound to ears of the driver, thereby transferring a sound substantially similar to an original sound to the driver.

Moreover, the vehicle according to an embodiment of the present disclosure may include the infotainment module ITM including the second display DIS2 to which the display apparatus according to an embodiment of the present disclosure illustrated in FIGS. 1 to 16 is applied, and thus, may output a sound, generated by a vibration of the second display DIS2, to ears of the driver and/or a passenger, thereby transferring a sound substantially similar to an original sound to the driver and/or the passenger.

Moreover, the vehicle according to an embodiment of the present disclosure may use each of the first display DIS1 of the instrument panel module IPM and the second display DIS2 of the infotainment module ITM as a speaker for outputting a sound, and may transfer a 2-channel stereo sound to the driver and/or the passenger using a sound generated by a vibration of each of the first and second displays DIS1 and DIS2.

Figure 18:
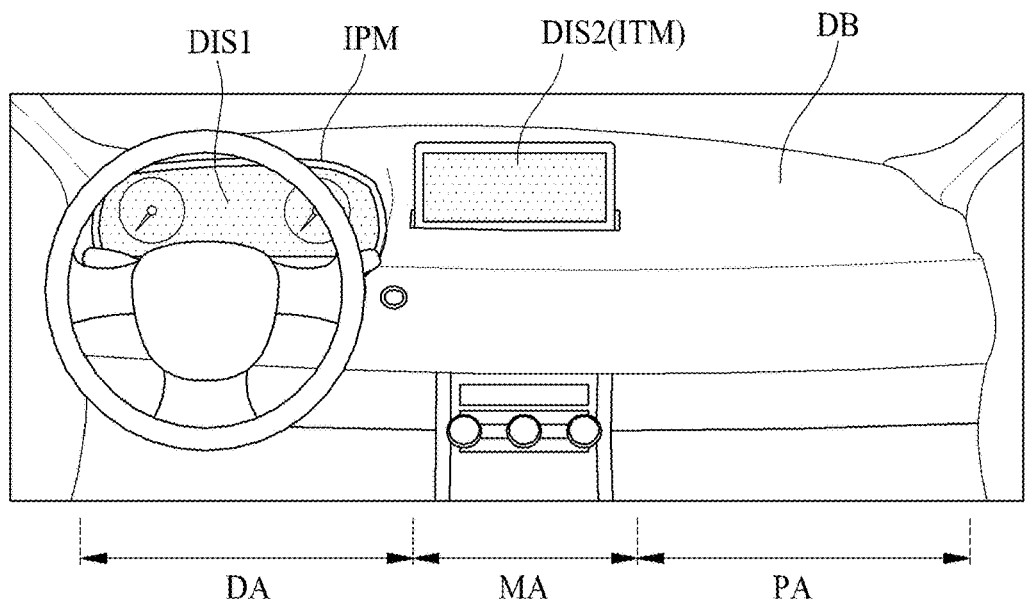
FIG. 18 illustrates a vehicle according to another embodiment of the present disclosure.

FIG. 18 illustrates a vehicle according to another embodiment of the present disclosure and illustrates an example where a structure of the infotainment module illustrated in FIG. 17 is modified. Hereinafter, descriptions of the same elements except an infotainment module and relevant elements will be briefly given or are omitted.

With reference to FIG. 18, an infotainment module ITM according to an embodiment of the present disclosure may be installed to be raised or lowered in a third region MA of a dashboard DB. The infotainment module ITM may be accommodated into the dashboard DB based on the power-off of a vehicle or manipulation of a passenger and may be protruded from the inside of the dashboard DB based on the power-on of the vehicle or manipulation of the passenger.

The infotainment module ITM according to an embodiment of the present disclosure may include a second display DIS2 and a display elevation unit.

The second display DIS2 is substantially the same as the second display DIS2 illustrated in FIG. 17, and thus, its repetitive description is omitted.

The display elevation unit (or display lifting unit) may be in the third region MA of the dashboard DB and may support the second display DIS2 so as to be raised or lowered. For example, the display elevation unit may raise the second display DIS2 to protrude the second display DIS2 from the inside of the dashboard DB, based on the power-on of the vehicle or manipulation of the passenger. Also, the display elevation unit may lower the second display DIS2 to accommodate or load the second display DIS2 into the dashboard DB, based on the power-off of the vehicle or manipulation of the passenger.

Therefore, the vehicle according to another embodiment of the present disclosure may have the same effect as that of the vehicle illustrated in FIG. 17.

Figure 19:
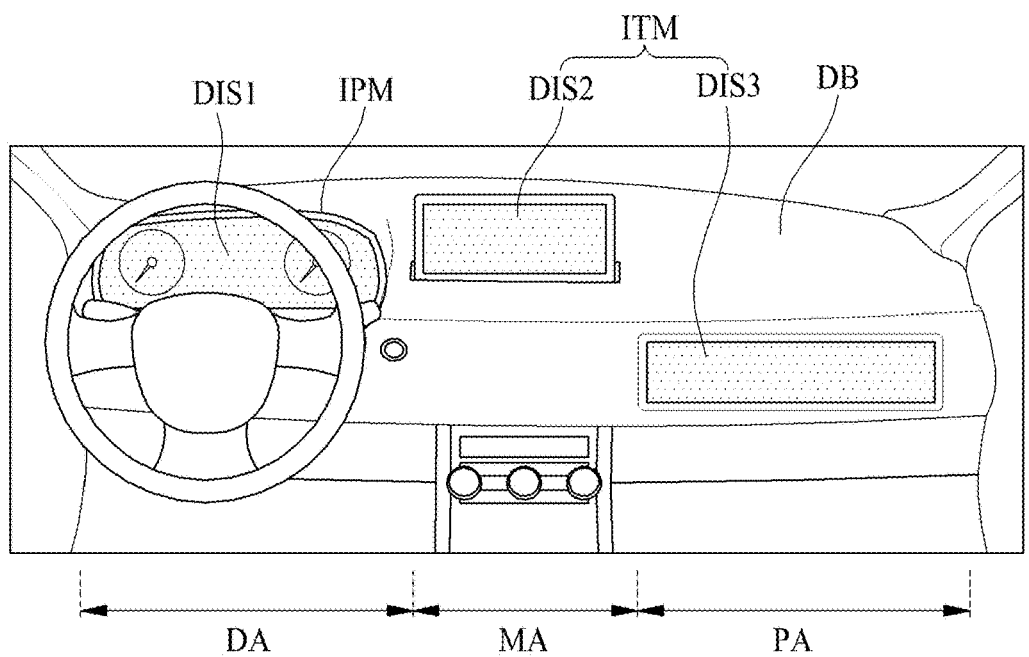
FIG. 19 illustrates a vehicle according to another embodiment of the present disclosure.

FIG. 19 illustrates a vehicle according to another embodiment of the present disclosure and illustrates an example where a structure of the infotainment module illustrated in FIG. 18 is modified. Hereinafter, descriptions of the same elements except an infotainment module and relevant elements will be briefly given or are omitted.

With reference to FIG. 19, an infotainment module ITM according to an embodiment of the present disclosure may include a second display DIS2, which is installed to be raised or lowered in a third region MA of a dashboard DB, a display elevation unit, which raises or lowers the second display DIS2, and a third display DIS3, which is installed in a second region PA of the dashboard DB.

The second display DIS2 and the display elevation unit are substantially the same as the second display and the display elevation unit each illustrated in FIG. 18, and thus, their repetitive descriptions are omitted.

The third display DIS3 may share a function of the second display DIS2. For example, the third display DIS3 may be connected to a navigation system and a vehicle convenience system such as an audio system, an air conditioning system, and a multimedia system each equipped in the vehicle, and may display navigation information provided from the navigation system and a control icon for controlling a corresponding vehicle convenience system. Also, the third display DIS3 may provide a passenger with a sound corresponding to a sound signal provided from the audio system and/or the multimedia system. Also, the third display DIS3 may transmit or receive image information or sound information through wireless communication with a wireless communication device of a passenger sitting on a passenger seat and may display the received image information on a display panel.

The third display DIS3 may include the display apparatus according to an embodiment of the present disclosure illustrated in FIGS. 1 to 16, and thus, its repetitive description is omitted.

The third display DIS3 may have a length that is enlarged toward the third region MA of the dashboard DB. For example, the third display DIS3 may be disposed in the second region PA and the third region MA of the dashboard DB.

A first display DIS1 of the instrument panel module IPM and the second and third displays DIS2 and DIS3 of the infotainment module ITM may each be used as a speaker for outputting a sound in the vehicle.

Therefore, the vehicle according to another embodiment of the present disclosure may have the same effect as that of the vehicle illustrated in FIG. 17 or FIG. 18. Also, the vehicle according to an embodiment of the present disclosure may use each of the first display DIS1 of the instrument panel module IPM and the second and third displays DIS2 and DIS3 of the infotainment module ITM as a speaker for outputting a sound, and may transfer a 3-channel stereo sound to a driver and/or a passenger using a sound generated by a vibration of each of the first to third displays DIS1, DIS2, and DIS3.

Figure 20:
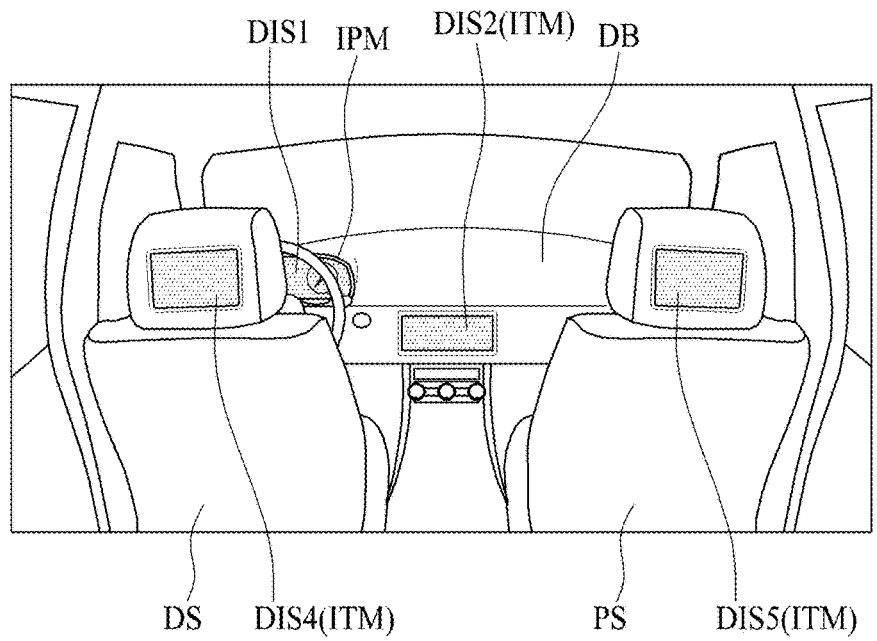
FIG. 20 illustrates a vehicle according to another embodiment of the present disclosure.

FIG. 20 illustrates a vehicle according to another embodiment of the present disclosure and illustrates an example where a structure of the infotainment module illustrated in FIG. 17 is modified. Hereinafter, descriptions of the same elements except an infotainment module and relevant elements will be briefly given or are omitted.

With reference to FIG. 20, an infotainment module ITM according to an embodiment of the present disclosure may further include a fourth display DIS4 disposed on a rear surface of a driver seat (or a driver seat sheet) DS and a fifth display DIS5 disposed on a rear surface of a passenger seat (or a passenger seat sheet) PS.

The fourth display DIS4 may be disposed in or buried into a headrest of the driver seat DS, and the fifth display DIS5 may be disposed in or buried into a headrest of the passenger seat PS.

Each of the fourth and fifth displays DIS4 and DIS5 may include the display apparatus according to an embodiment of the present disclosure illustrated in FIGS. 1 to 16, and thus, their repetitive descriptions are omitted.

Each of the fourth and fifth displays DIS4 and DIS5 may share a function of the second display DIS2. Also, each of the fourth and fifth displays DIS4 and DIS5 may transmit or receive image information or sound information through wireless communication with a wireless communication device of a passenger sitting in a back seat, and may display the received image information on a display panel.

A first display DIS1 of the instrument panel module IPM and the second, fourth, and fifth displays DIS2, DIS4, and DIS5 of the infotainment module ITM may each be used as a speaker for outputting a sound in the vehicle.

Therefore, the vehicle according to another embodiment of the present disclosure may have the same effect as that of the vehicle illustrated in FIG. 17. Also, the vehicle according to an embodiment of the present disclosure may use each of the first display DIS1 of the instrument panel module IPM and the second, fourth, and fifth displays DIS2, DIS4, and DIS5 of the infotainment module ITM as a speaker for outputting a sound, and may transfer a 4-channel stereo sound to a driver and/or a passenger using a sound generated by a vibration of each of the first, second, fourth, and fifth displays DIS1, DIS2, DIS4, and DIS5.

Additionally, in the vehicle according to an embodiment of the present disclosure, as illustrated in FIG. 18, the second display DIS2 of the infotainment module ITM may be installed in a third region MA of a dashboard DB so as to be raised or lowered. Also, the infotainment module ITM may further include the third display DIS3 illustrated in FIG. 19. In this case, the vehicle according to an embodiment of the present disclosure may use at least one of the first display DIS1 of the instrument panel module IPM and the second to fifth displays DIS2 to DIS5 of the infotainment module ITM as a speaker for outputting a sound and may transfer a sound, generated by a vibration of a display panel included in at least one of the first to fifth displays DIS1 to DIS5, to a driver and/or a passenger.

Figure 21:
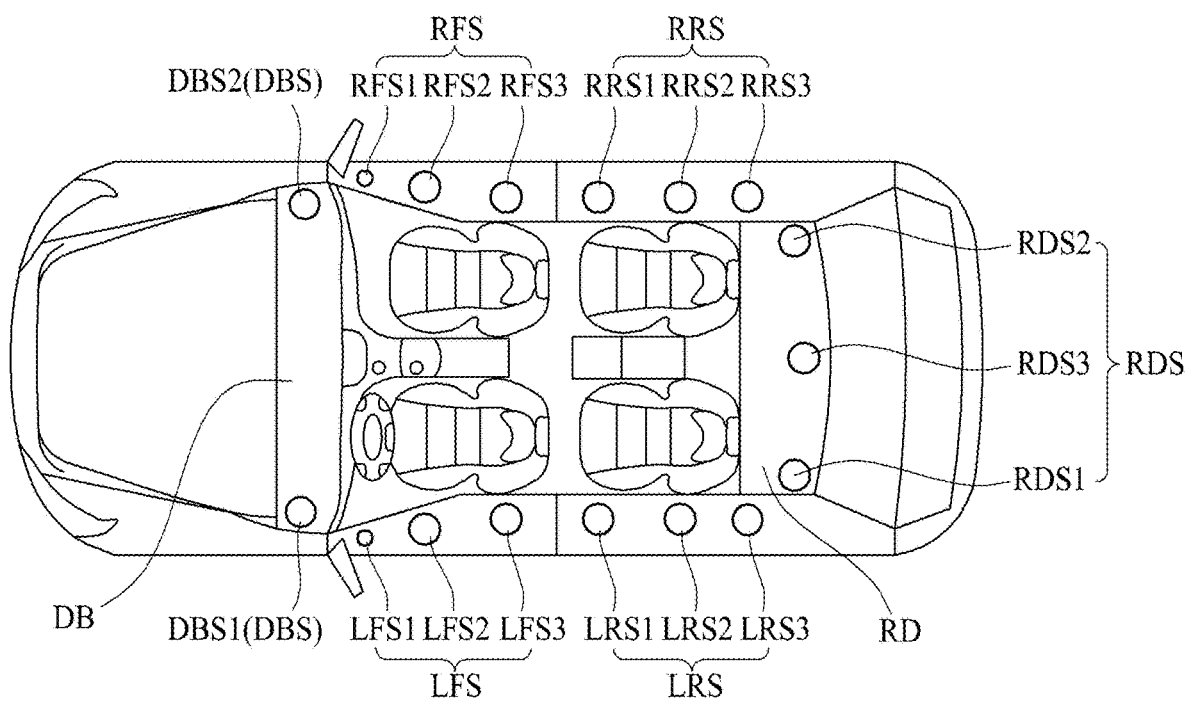
FIG. 21 illustrates a vehicle according to another embodiment of the present disclosure.

FIG. 21 illustrates a vehicle according to another embodiment of the present disclosure and illustrates an example where a speaker is added to the vehicle illustrated in one of FIGS. 17 to 20. Hereinafter, descriptions of the same elements except a separate speaker and relevant elements will be briefly given or are omitted.

Because reverberation is severe in a vehicle and there are many curves with which sound waves collide, there is a problem where it is difficult to output a desired sound. Therefore, in a case where a display apparatus according to an embodiment of the present disclosure is provided in a vehicle or a vehicle body, a speaker installed in the vehicle may be implemented to have a small size, and a sound output from the vehicle may be enhanced.

With reference to FIG. 21, the vehicle according to another embodiment of the present disclosure may further include at least one of a dashboard speaker DBS, a left front door speaker LFS, a right front door speaker RFS, a left rear door speaker LRS, a right rear door speaker RRS, and a rear deco speaker RDS.

The dashboard speaker DBS may include at least one of a first dashboard speaker DBS1 disposed at a left periphery portion of a dashboard DB and a second dashboard speaker DBS2 disposed at a right periphery portion of the dashboard DB. For example, each of the first dashboard speaker DBS1 and the second dashboard speaker DBS2 may be a speaker that outputs a sound of 150 Hz to 20 kHz having a mid-range or a full-range.

The left front door speaker LFS may include at least one of first to third left front speakers LFS1 to LFS3.

The first left front speaker LFS1 may be disposed at a first portion of a left front door adjacent to the dashboard DB. The second left front speaker LFS2 may be disposed at a middle portion of the left front door. The third left front speaker LFS3 may be disposed at a second portion of the left front door adjacent to a left rear door. For example, the first left front speaker LFS1 may be a display panel speaker implemented with the display apparatus illustrated in FIGS. 1 to 12. In this case, the left front speaker may output a sound based on a vibration of the display panel and may act as a left side mirror that displays an image from a left rear camera disposed on a left surface of the vehicle.

The right front door speaker RFS may include at least one of first to third right front speakers RFS1 to RFS3.

The first right front speaker RFS1 may be disposed at a first portion of a right front door adjacent to the dashboard DB. The second right front speaker RFS2 may be disposed at a middle portion of the right front door. The third right front speaker RFS3 may be disposed at a second portion of the right front door adjacent to a right rear door. For example, the first right front speaker RFS1 may be a display panel speaker implemented with the display apparatus illustrated in FIGS. 1 to 16. In this case, the right front speaker may output a sound based on a vibration of the display panel, and may act as a right side mirror that displays an image from a right rear camera disposed on a right surface of the vehicle.

Each of the first left front speaker LFS1 and the first right front speaker RFS1 may be a speaker that outputs a sound of 150 Hz to 20 kHz having the mid-range or the full-range. Sounds output from the first left front speaker LFS1 and the first right front speaker RFS1 may be combined and output.

Each of the second left front speaker LFS2 and the second right front speaker RFS2 may be a tweeter, or may be a speaker that outputs a sound of 2 kHz to 20 kHz. Sounds output from the first and second left front speakers LFS1 and LFS2 and the first and second right front speakers RFS1 and RFS2 may be combined and output.

Each of the third left front speaker LFS3 and the third right front speaker RFS3 may be one of a woofer, a mid-woofer, and a sub-woofer, or may be a speaker that outputs a sound of 150 Hz to 20 kHz having the mid-range or the full-range. Sounds output from the third left front speaker LFS3 and the third right front speaker RFS3 may be combined and output.

The left rear door speaker LRS may include at least one of first to third left rear speakers LRS1 to LRS3.

The first left rear speaker LRS1 may be disposed at a first portion of a left rear door adjacent to the left front door. The second left rear speaker LRS2 may be disposed at a middle portion of the left rear door. The third left rear speaker LRS3 may be disposed at a second portion of the left rear door adjacent to a rear deco RD.

The right rear door speaker RRS may include at least one of first to third right rear speakers RRS1 to RRS3.

The first right rear speaker RRS1 may be disposed at a first portion of a right rear door adjacent to the right front door. The second right rear speaker RRS2 may be disposed at a middle portion of the right rear door. The third right rear speaker RRS3 may be disposed at a second portion of the right rear door adjacent to the rear deco RD.

Each of the first left rear speaker LRS1 and the first right rear speaker RRS1 may be a tweeter, or may be a speaker which outputs a sound of 2 kHz to 20 kHz. Sounds output from the first left rear speaker LRS1 and the first right rear speaker RRS1 may be combined and output.

Each of the second left rear speaker LRS2 and the second right rear speaker RRS2 may be a speaker which outputs a sound of 150 Hz to 20 kHz having the mid-range or the full-range. Sounds output from the first and second left rear speakers LRS1 and LRS2 and the first and second right rear speakers RRS1 and RRS2 may be combined and output.

Each of the third left rear speaker LRS3 and the third right rear speaker RRS3 may be one of a woofer, a mid-woofer, and a sub-woofer, or may be a speaker which outputs a sound of 150 Hz to 20 kHz having the mid-range or the full-range. Sounds output from the third left rear speaker LRS3 and the third right rear speaker RRS3 may be combined and output.

The rear deco speaker RDS may include at least one of a first rear deco speaker RDS1 disposed at a left periphery portion of the rear deco RD, a second rear deco speaker RDS2 disposed at a right periphery portion of the rear deco RD, and a third rear deco speaker RDS3 disposed at a middle portion of the rear deco RD.

Each of the first rear deco speaker RDS1 and the second rear deco speaker RDS2 may be a speaker which outputs a sound of 150 Hz to 20 kHz having the mid-range or the full-range.

The third rear deco speaker RDS3 may be one of a woofer, a mid-woofer, and a sub-woofer, or may be a speaker which outputs a sound of 60 Hz to 150 Hz, or may be at least one tweeter, or may be a speaker which outputs a sound of 2 kHz to 20 kHz.

A speaker disposed on the left and a speaker disposed on the right may be provided to be symmetrical with respect to a direction toward a front window of a vehicle. For example, a frequency of a sound output from a speaker disposed on an internal left side of a vehicle may be one or more of 150 Hz to 20 kHz and 2 kHz to 20 kHz, and a frequency of a sound output from a sound generating device disposed on an internal right side of the vehicle may be one or more of 150 Hz to 20 kHz and 2 kHz to 20 kHz. When a speaker is configured as described above, localization of a sound output from each of an internal left side and an internal right side of a vehicle may be enhanced.

Therefore, the vehicle according to another embodiment of the present disclosure may use at least one of the first display DIS1 of the instrument panel module IPM and the second to fifth displays DIS2 to DIS5 of the infotainment module ITM as a speaker for outputting a sound, may output a sound generated by a vibration of a display panel included in at least one of the first to fifth displays DIS1 to DIS5, and may output a sound through at least one speaker disposed in at least one of the dashboard DB, the rear deco RD, the left door, and the right door, thereby providing a multichannel surround stereo sound to a driver and/or a passenger.

Figure 22:
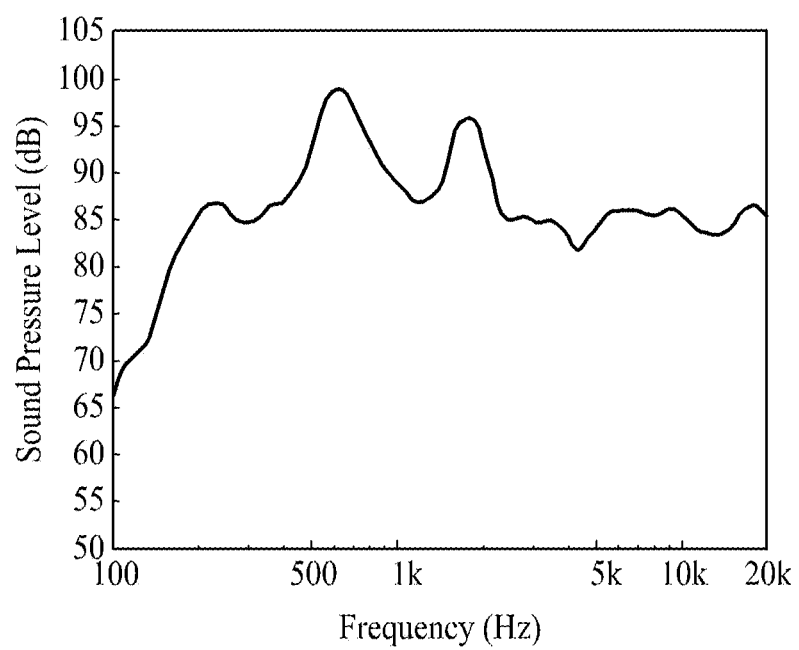
FIG. 22 is a graph showing an experimental result of a sound pressure characteristic of a display apparatus according to an embodiment of the present disclosure.

FIG. 22 is a graph showing an experimental result for a sound pressure characteristic of a display apparatus according to an embodiment of the present disclosure. In FIG. 22, Audio Precision company's APX525 has been used for measuring a sound pressure level, sine sweep has been applied at 100 Hz to 20 kHz, and the sound pressure level has been measured at a position spaced apart from a display panel by 1 m. The sine sweep may be a method of performing sweep for a short time, but is not limited thereto. In FIG. 18, the abscissa axis represents a frequency (Hz), and the ordinate axis represents a sound pressure level (SPL) (dB).

As seen in FIG. 22, it may be seen that a sound output from the display apparatus according to an embodiment of the present disclosure illustrated in FIGS. 1 to 9 has a reproduction band of 100 Hz to 20 kHz and is output at a sound pressure level of 65 dB or more, and for example, a sound of 150 Hz to 20 kHz is output at a sound pressure level of 75 dB or more. Accordingly, even without a separate speaker, the display apparatus according to an embodiment of the present disclosure may vibrate the display panel to output a sound of 100 Hz to 20 kHz.

Additionally, a sound pressure level of a sound decreases in proportion to the square root of a distance. Generally, considering that a sound pressure level of a voice of a person speaking at a position spaced apart from a listener by 0.5 m is about 60 dB, a sound pressure level which enables a listener spaced apart from a display apparatus by about 2 m to easily listen to a sound output from the display apparatus should satisfy about 72 dB to 75 dB. Accordingly, with respect to a sound pressure level of 74 dB, the display apparatus according to an embodiment of the present disclosure may provide a sound of 150 Hz to 20 kHz having a sound pressure level of 75 dB or more to a listener apart therefrom by about 2 m.

The display apparatus according to an embodiment of the present disclosure may be applied to various applications that output sound based on a vibration of a display panel. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wallpaper display apparatuses, signage apparatuses, game machines, notebook computers, monitors, cameras, camcorders, home appliances, etc. Also, the flexible vibration module according to an embodiment of the present disclosure may be applied to organic light-emitting lighting apparatuses or inorganic light-emitting lighting apparatuses. Furthermore, when the flexible vibration module according to the present disclosure is applied to a mobile apparatus, the flexible vibration module may act as a speaker or a receiver.

A display apparatus and a vehicle including the same according to an embodiment of the present disclosure will be described below.

A display apparatus according to an embodiment of the present disclosure includes a display panel configured to display an image; a front member on a front surface of the display panel; a driving circuit on a rear surface of the display panel and connected to the display panel; a supporting frame configured to surround a side surface of the display panel and a side surface of the driving circuit; a first support supported by the supporting frame and on the rear surface of the display panel; and a vibration generating module supported by the first support to vibrate the display panel.

According to some embodiments of the present disclosure, the display apparatus further includes a second support between the rear surface of the display panel and the driving circuit, wherein the driving circuit includes a flexible circuit film connected to the display panel; and a printed circuit board connected to the flexible circuit film at the rear surface of the display panel and supported by the second support.

According to some embodiments of the present disclosure, the second support includes a double-sided tape.

According to some embodiments of the present disclosure, the double-sided tape includes foam.

According to some embodiments of the present disclosure, the display apparatus further includes another printed circuit board in a third region other than a first region that overlaps the printed circuit board and a second region that overlaps the vibration generating module.

According to some embodiments of the present disclosure, the display apparatus further includes the driving circuit including a printed circuit board on the rear surface of the display panel; and a second support between the rear surface of the display panel and the driving circuit, wherein the second support comprises a holder at the supporting frame to support the printed circuit board.

According to some embodiments of the present disclosure, the holder includes a second plate on the printed circuit board with an adhesive member therebetween and spaced apart from the rear surface of the display panel; and a pair of bridges bent from both sides of the second plate and connected to the supporting frame.

According to some embodiments of the present disclosure, the display apparatus further includes a buffering member between the second plate and the rear surface of the display panel.

According to some embodiments of the present disclosure, the display apparatus further includes the driving circuit including a printed circuit board on the rear surface of the display panel; and a buffering member between the rear surface of the display panel and the printed circuit board.

According to some embodiments of the present disclosure, the first support includes a first plate on the rear surface of the display panel; a side portion bent from a side of the first plate and supported by the supporting frame; and a first forming portion on the first plate to support the vibration generating module.

According to some embodiments of the present disclosure, the first support further includes a second forming portion protruding from a center portion of the first plate towards the rear surface of the display panel; and a hole in the first forming portion, wherein a portion of a rear surface of the vibration generating module is accommodated in the hole; and wherein the second forming portion surrounds the first forming portion.

According to some embodiments of the present disclosure, the vibration generating module includes a first sound generator in a first region of the first forming portion to vibrate a first region of the rear surface of the display panel; and a second sound generator in a second region of the first forming portion to vibrate a second region of the rear surface of the display panel.

According to some embodiments of the present disclosure, the vibration generating module includes a first sound generator in a first region of the first forming portion to vibrate a first region of the rear surface of the display panel; a second sound generator in a second region of the first forming portion to vibrate a second region of the rear surface of the display panel; a third sound generator configured to vibrate a third region of the rear surface of the display panel; and a fourth sound generator configured to vibrate a fourth region of the rear surface of the display panel.

A display apparatus according to an embodiment of the present disclosure includes a display panel configured to display an image; a front member on a front surface of the display panel; a first support on a rear surface of the display panel; a vibration generating module supported by the first support to vibrate the display panel; and a printed circuit board between the rear surface of the display panel and the first support.

According to some embodiments of the present disclosure, the display apparatus further includes a second support between the rear surface of the display panel and the printed circuit board.

According to some embodiments of the present disclosure, the second support includes a double-sided tape.

According to some embodiments of the present disclosure, the double-sided tape includes foam.

According to some embodiments of the present disclosure, the display apparatus further includes a balance member in a third region other than a first region that overlaps the printed circuit board and a second region that overlaps the vibration generating module.

According to some embodiments of the present disclosure, the balance member includes another printed circuit board having a size greater than a size of the printed circuit board; and an adhesive member between the rear surface of the display panel and the other printed circuit board.

According to some embodiments of the present disclosure, the display apparatus further includes a supporting frame on a rear surface of the front member to surround a side surface of the display panel and support the first support; and a second support between the rear surface of the display panel and the printed circuit board.

According to some embodiments of the present disclosure, the display apparatus further includes the second support including a holder to support the printed circuit board; and the holder includes a second plate on a rear surface of the printed circuit board with an adhesive member therebetween; and a pair of bridges bent from both sides of the second plate and connected to the supporting frame.

According to some embodiments of the present disclosure, the second support further includes a buffering member between the rear surface of the display panel and the holder.

According to some embodiments of the present disclosure, the supporting frame surrounds a side surface of the printed circuit board.

According to some embodiments of the present disclosure, the display apparatus further includes a buffering member between the rear surface of the display panel and the printed circuit board.

According to some embodiments of the present disclosure, the display apparatus further includes a supporting frame between the front member and the first support to surround a side surface of the display panel, wherein the first support includes a first plate on the rear surface of the display panel; a side portion bent from a side of the first plate and supported by the supporting frame; and a first forming portion on the first plate to support the vibration generating module.

According to some embodiments of the present disclosure, the first support further includes a hole in the first forming portion; and a portion of a rear surface of the vibration generating module is accommodated in the hole of the first forming portion.

According to some embodiments of the present disclosure, the display apparatus further includes the first support further includes a second forming portion protruding from a center portion of the first plate towards the rear surface of the display panel; and a hole in the first forming portion, wherein a portion of a rear surface of the vibration generating module is accommodated in the hole; and wherein the second forming portion surrounds the first forming portion.

According to some embodiments of the present disclosure, the vibration generating module includes a first sound generator in a first region of the first forming portion to vibrate a first region of the rear surface of the display panel; and a second sound generator in a second region of the first forming portion to vibrate a second region of the rear surface of the display panel.

According to some embodiments of the present disclosure, the vibration generating module includes a first sound generator in a first region of the first forming portion to vibrate a first region of the rear surface of the display panel; a second sound generator in a second region of the first forming portion to vibrate a second region of the rear surface of the display panel; a third sound generator configured to vibrate a third region of the rear surface of the display panel; and a fourth sound generator configured to vibrate a fourth region of the rear surface of the display panel.

According to some embodiments of the present disclosure, the third sound generator includes a piezoelectric material; and the fourth sound generator includes a piezoelectric material.

According to some embodiments of the present disclosure, the display apparatus further includes a heat insulation member between the vibration generating module and the display panel.

According to some embodiments of the present disclosure, the display apparatus further includes a connection member configured to connect the vibration generating module to an inner surface of the first support.

A vehicle according to an embodiment of the present disclosure includes a dashboard including a first region facing a driver seat; and an instrument panel module including a first display in the first region of the dashboard; wherein the first display includes a display apparatus including a display panel configured to display an image; a front member on a front surface of the display panel; a driving circuit on a rear surface of the display panel and connected to the display panel; a supporting frame configured to surround a side surface of the display panel and a side surface of the driving circuit; a first support supported by the supporting frame and on the rear surface of the display panel; and a vibration generating module supported by the first support to vibrate the display panel.

According to some embodiments of the present disclosure, the first display outputs a sound based on a vibration of the display panel as vibrated by the vibration generating module.

According to some embodiments of the present disclosure, the vehicle further includes a left front door, a right front door, a left rear door, a right rear door, and a rear deco; and at least one of a dashboard speaker on the dashboard, a left front door speaker at the left front door, a right front door speaker at the right front door, a left rear door speaker at the left rear door, a right rear door speaker at the right rear door, and a rear deco speaker at the rear deco.

A vehicle according to an embodiment of the present disclosure includes a dashboard including a first region facing a driver seat, a second region facing a passenger seat, and a third region between the first region and the second region; an instrument panel module including a first display in the first region of the dashboard; and an infotainment module including a second display in the third region of the dashboard, a third display in the second region of the dashboard, a fourth display on a rear surface of the driver seat, and a fifth display on a rear surface of the passenger seat, wherein at least one of the first to fifth displays includes a display apparatus including a display panel configured to display an image; a front member on a front surface of the display panel; a driving circuit on a rear surface of the display panel and connected to the display panel; a supporting frame configured to surround a side surface of the display panel and a side surface of the driving circuit; a first support supported by the supporting frame and on the rear surface of the display panel; and a vibration generating module supported by the first support to vibrate the display panel.

According to some embodiments of the present disclosure, at least one of the first to fifth displays outputs a sound based on a vibration of the display panel as vibrated by the vibration generating module.

A vehicle according to an embodiment of the present disclosure includes a dashboard including a display apparatus including a display panel configured to display an image; a front member on a front surface of the display panel; a driving circuit on a rear surface of the display panel and connected to the display panel; a supporting frame configured to surround a side surface of the display panel and a side surface of the driving circuit; a first support supported by the supporting frame and on the rear surface of the display panel; and a vibration generating module supported by the first support to vibrate the display panel.

It will be apparent to those skilled in the art that various modifications and variations may be made in the present disclosure without departing from the technical idea or scope of the disclosures. Thus, it may be intended that embodiments of the present disclosure cover the modifications and variations of the disclosure provided they come within the scope of the appended claims and their equivalents.

What is claimed is:

1. An apparatus, comprising:
    a display panel configured to display an image;
    a driving circuit at a rear surface of the display panel and including a printed circuit board electrically connected to the display panel;
    a supporting frame configured to surround a side surface of the display panel;
    a first support supported by the supporting frame and covering a rear surface of the display panel;
    a second support at the rear surface of the display panel and including a holder configured to support the printed circuit board;
    one or more sound generators supported by the first support, the one or more sound generators configured to vibrate the display panel; and
    one or more piezoelectric devices connected to a periphery portion of the rear surface of the display panel, the one or more piezoelectric devices configured to vibrate the periphery portion of the rear surface of the display panel,
    wherein the holder comprises:
        a second plate supporting the printed circuit board; and
        a pair of bridges bent from both sides of the second plate and connected to the supporting frame,
    wherein the first support comprises:
        a first portion covering at least a portion of a rear surface of the one or more sound generators; and
        a second portion covering at least a portion of a rear surface of the one or more piezoelectric devices, and
    wherein the first portion of the first support is spaced farther apart from the rear surface of the display panel than the second portion of the first support is.

2. The apparatus of claim 1,
    wherein the one or more sound generators are configured to vibrate the display panel and output sound of a first sound band, and
    wherein the one or more piezoelectric devices are configured to vibrate the display panel and output sound of a second sound band higher than the sound of the first sound band.

3. The apparatus of claim 1, wherein the one or more piezoelectric devices are connected to the rear periphery portion of the display panel by a connection member.

4. The apparatus of claim 1, further comprising one or more protection members disposed at the rear surface of the one or more piezoelectric devices.

5. The apparatus of claim 4, wherein the one or more protection members have a greater size than the one or more piezoelectric devices.

6. The apparatus of claim 4, wherein the one or more protection members comprise one of a polyimide (PI) film, a polyethylene terephthalate (PET) insulation tape, and a polyvinyl chloride (PVC) insulation tape.

7. The apparatus of claim 1, wherein the one or more sound generators comprise:
    a first sound generator supported by the first support, the first sound generator configured to vibrate a first region of the display panel; and
    a second sound generator supported by the first support, the second sound generator configured to vibrate a second region of the display panel.

8. The apparatus of claim 1, wherein the one or more piezoelectric devices comprise:
    a first piezoelectric device connected to a third region of the rear surface of the display panel, the first piezoelectric device configured to vibrate the third region of the display panel; and
    a second piezoelectric device connected to a fourth region of the rear surface of the display panel, the second piezoelectric device configured to vibrate the fourth region of the display panel.

9. The apparatus of claim 1, wherein the first support comprises:
    a first plate spaced apart from the rear surface of the display panel and covering a portion of the rear surface of the display panel;
    a side portion bent from a side of the first plate and supported by the supporting frame,
    wherein the first portion of the first support is a first forming portion connected to the first plate and protruding away from the rear surface of the display panel, the first forming portion being configured to support the one or more sound generators.

10. The apparatus of claim 9, wherein:
    the second portion of the first support is a second forming portion protruding from a center portion of the first plate toward the rear surface of the display panel, the first forming portion includes a hole, in which at least a portion of the one or more sound generators is accommodated, and the second forming portion surrounds the first forming portion in a plan view.

11. The apparatus of claim 1, wherein the supporting frame includes an opening having a greater size than the display panel, the opening being covered by the first support at a rear surface of the supporting frame, and wherein the one or more piezoelectric devices are configured to be accommodated in the opening of the supporting frame.

12. The apparatus of claim 11, wherein the driving circuit is configured to be accommodated in the opening of the supporting frame, and wherein the driving circuit is electrically connected to the display panel.

13. The apparatus of claim 1, wherein the second support is between the rear surface of the display panel and the driving circuit, wherein the driving circuit comprises a flexible circuit film connected to the display panel, and wherein the printed circuit board is connected to the flexible circuit film at the rear surface of the display panel and supported by the second plate.

14. The apparatus of claim 1, wherein the second support further comprises an adhesive member between the printed circuit board and the second plate.

15. The apparatus of claim 1, wherein the second support further comprises a buffering member between the rear surface of the display panel and the second plate.

16. A vehicle, comprising:
a dashboard comprising:
a first region facing a driver seat;
a second region facing a passenger seat; and
a third region between the first region and the second region;
an instrument panel including a first display in the first region of the dashboard; and
an infotainment device comprising:
a second display in the third region of the dashboard;
a third display in the second region of the dashboard;
a fourth display at a rear surface of the driver seat; and
a fifth display at a rear surface of the passenger seat,
wherein at least one of the first to fifth displays comprises the apparatus of claim 1.

17. The vehicle of claim 16, further comprising:
a left front door, a right front door, a left rear door, a right rear door, and a rear deco; and
at least one of: a dashboard speaker on the dashboard, a left front door speaker at the left front door, a right front door speaker at the right front door, a left rear door speaker at the left rear door, a right rear door speaker at the right rear door, and a rear deco speaker at the rear deco.

18. An apparatus, comprising:
a display panel configured to display an image;
a driving circuit at a rear surface of the display panel and including a printed circuit board electrically connected to the display panel;
a supporting frame configured to surround a side surface of the display panel and the driving circuit;
a first support supported by the supporting frame and covering the rear surface of the display panel and a rear surface of the driving circuit;

a second support at the rear surface of the display panel and including a holder configured to support the printed circuit board; and one or more sound generators supported by the first support, the one or more sound generators configured to vibrate the display panel, wherein the holder comprises:
a second plate supporting the printed circuit board; and
a pair of bridges bent from both sides of the second plate and connected to the supporting frame, and wherein the first support comprises:
a first plate spaced apart from and covering a portion of the rear surface of the display panel; and
a forming portion connected to the first plate and protruding away from the rear surface of the display panel to accommodate at least a portion of the one or more sound generators between an inner surface of the forming portion and the rear surface of the display panel.

19. The apparatus of claim 18, wherein the first support further comprises:
a side portion bent from a side of the first plate, the side portion being supported by the supporting frame, and
wherein the forming portion is configured to support the one or more sound generators.

20. The apparatus of claim 18, wherein the second support further comprises an adhesive member between the printed circuit board and the second plate.

21. The apparatus of claim 18, wherein the second support further comprises a buffering member between the rear surface of the display panel and the second plate.

22. The apparatus of claim 18, further comprising one or more piezoelectric devices connected to a periphery portion of the rear surface of the display panel, the one or more sound generators configured to vibrate the periphery portion of the rear surface of the display panel.

23. The apparatus of claim 22,
wherein the one or more sound generators are configured to vibrate the display panel and output sound of a first sound band, and
wherein the one or more piezoelectric devices are configured to vibrate the display panel and output sound of a second sound band higher than the sound of the first sound band.

24. The apparatus of claim 22, wherein the one or more sound generators comprise:
a first sound generator supported by the first support, the first sound generator configured to vibrate a first region of the display panel; and
a second sound generator supported by the first support, the second sound generator configured to vibrate a second region of the display panel.

25. The apparatus of claim 22, wherein the one or more piezoelectric devices comprise:
a first piezoelectric device connected to a third region of the rear surface of the display panel, the first piezoelectric device configured to vibrate the third region of the display panel; and
a second piezoelectric device connected to a fourth region of the rear surface of the display panel, the second piezoelectric device configured to vibrate the fourth region of the display panel.

* * * * *